United States Patent
Lazarev

(10) Patent No.: US 10,347,423 B2
(45) Date of Patent: *Jul. 9, 2019

(54) SOLID MULTILAYER STRUCTURE AS SEMIPRODUCT FOR META-CAPACITOR

(71) Applicant: Capacitor Sciences Incorporated, Menlo Park, CA (US)

(72) Inventor: Pavel Ivan Lazarev, Menlo Park, CA (US)

(73) Assignee: CAPACITOR SCIENCES INCORPORATED, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/782,752

(22) Filed: Oct. 12, 2017

(65) Prior Publication Data

US 2018/0114641 A1 Apr. 26, 2018

Related U.S. Application Data

(63) Continuation-in-part of application No. 15/449,524, filed on Mar. 3, 2017, which is a continuation-in-part
(Continued)

(51) Int. Cl.
*H01G 4/14* (2006.01)
*H01G 4/30* (2006.01)
(Continued)

(52) U.S. Cl.
CPC .................. *H01G 4/14* (2013.01); *H01G 4/08* (2013.01); *H01G 4/18* (2013.01); *H01G 4/228* (2013.01); *H01G 4/30* (2013.01); *H01G 4/32* (2013.01)

(58) Field of Classification Search
CPC ............ H01G 4/18; H01G 4/018; H01G 4/20; H01G 4/206; H01G 4/232; H01G 9/07; H01G 4/14; H01G 4/221; H01G 4/306
See application file for complete search history.

(56) References Cited

U.S. PATENT DOCUMENTS 3,407,394 A 10/1968 Hartke
4,549,034 A 10/1985 Sato et al.
(Continued)

FOREIGN PATENT DOCUMENTS

CA 2074848 A1 2/1998
CN 1582506 A 2/2005
(Continued)

OTHER PUBLICATIONS

Co-Pending U.S. Appl. No. 15/194,224, to Lazarev et al., filed Jun. 27, 2016.
(Continued)

*Primary Examiner* — Dion Ferguson
(74) *Attorney, Agent, or Firm* — BCF LLP

(57) ABSTRACT

The present disclosure provides solid multilayer structure having m polarization layers, and m+1 insulating layers disposed in a repeating sequence with the polarization layers, At least one polarization layer is comprised of materials selected from non-linear polarizable composite compounds and side chain polymers with non-linear polarizable pendants, and m is a number greater than or equal to 1. The insulating layer has a breakdown voltage greater than or equal to 0.01 volts (V) per nanometer (nm), and the polarization layer has a dielectric permittivity greater than or equal to 100. The solid multilayer structure may be used as a dielectric layer between two electrodes in capacitor.

22 Claims, 8 Drawing Sheets

Related U.S. Application Data of application No. 14/710,491, filed on May 12, 2015, now Pat. No. 9,589,727, application No. 15/782,752, which is a continuation-in-part of application No. 14/710,480, filed on May 12, 2015, now Pat. No. 9,899,150.

(60) Provisional application No. 61/991,861, filed on May 12, 2014, provisional application No. 61/991,871, filed on May 12, 2014.

(51) Int. Cl.
    *H01G 4/228*     (2006.01)
    *H01G 4/08*     (2006.01)
    *H01G 4/32*     (2006.01)
    *H01G 4/18*     (2006.01)

(56) References Cited

U.S. PATENT DOCUMENTS

| | | | |
|---|---|---|---|
| 4,694,377 A | 9/1987 | MacDougall et al. |
| 4,702,562 A | 10/1987 | Scheuble et al. |
| 4,780,531 A | 10/1988 | Kano et al. |
| 4,894,186 A | 1/1990 | Gordon et al. |
| 5,141,837 A | 8/1992 | Nguyen et al. |
| 5,187,639 A | 2/1993 | Ogawa et al. |
| 5,248,774 A | 9/1993 | Dietz et al. |
| 5,312,896 A | 5/1994 | Bhardwaj et al. |
| 5,384,521 A | 1/1995 | Coe |
| 5,395,556 A | 3/1995 | Drost et al. |
| 5,466,807 A | 11/1995 | Dietz et al. |
| 5,514,799 A | 5/1996 | Varanasi et al. |
| 5,581,437 A | 12/1996 | Sebillotte et al. |
| 5,583,359 A | 12/1996 | Ng et al. |
| 5,597,661 A | 1/1997 | Takeuchi et al. |
| 5,679,763 A | 10/1997 | Jen et al. |
| 5,742,471 A | 4/1998 | Barbee et al. |
| 5,840,906 A | 11/1998 | Zoltewicz et al. |
| 5,880,951 A | 3/1999 | Inaba |
| 6,025,094 A | 2/2000 | Visco et al. |
| 6,282,081 B1 | 8/2001 | Takabayashi et al. |
| 6,294,593 B1 | 9/2001 | Jeng et al. |
| 6,341,056 B1 | 1/2002 | Allman et al. |
| 6,391,104 B1 | 5/2002 | Schulz |
| 6,426,861 B1 | 7/2002 | Munshi |
| 6,501,093 B1 | 12/2002 | Marks |
| 6,519,136 B1 | 2/2003 | Chu et al. |
| 6,617,830 B2 | 9/2003 | Nozu et al. |
| 6,798,642 B2 | 9/2004 | Decker et al. |
| 7,025,900 B2 | 4/2006 | Sidorenko et al. |
| 7,033,406 B2 | 4/2006 | Weir et al. |
| 7,211,824 B2 | 5/2007 | Lazarev |
| 7,342,755 B1 | 3/2008 | Horvat et al. |
| 7,460,352 B2 | 12/2008 | Jamison et al. |
| 7,466,536 B1 | 12/2008 | Weir et al. |
| 7,498,689 B2 | 3/2009 | Mitani et al. |
| 7,579,709 B2 | 8/2009 | Goetz et al. |
| 7,625,497 B2 | 12/2009 | Iverson et al. |
| 7,678,907 B2 | 3/2010 | Koenemann et al. |
| 7,750,505 B2 | 7/2010 | Ichikawa |
| 7,795,431 B2 | 9/2010 | Pschirer et al. |
| 7,808,771 B2 | 10/2010 | Nguyen et al. |
| 7,837,902 B2 | 11/2010 | Hsu et al. |
| 7,893,265 B2 | 2/2011 | Facchetti et al. |
| 7,910,736 B2 | 3/2011 | Koenemann et al. |
| 7,947,199 B2 | 5/2011 | Wessling |
| 7,990,679 B2 | 8/2011 | Ehrenberg et al. |
| 8,143,853 B2 | 3/2012 | Jestin et al. |
| 8,222,074 B2 | 7/2012 | Lazarev |
| 8,231,809 B2 | 7/2012 | Pschirer et al. |
| 8,236,998 B2 | 8/2012 | Nagata et al. |
| 8,344,142 B2 | 1/2013 | Marder et al. |
| 8,372,527 B2 | 2/2013 | Morishita et al. |
| 8,404,844 B2 | 3/2013 | Kastler et al. |
| 8,527,126 B2 | 9/2013 | Yamamoto et al. |
| 8,552,179 B2 | 10/2013 | Lazarev |
| 8,766,566 B2 | 7/2014 | Baba et al. |
| 8,818,601 B1 | 8/2014 | V et al. |
| 8,831,805 B2 | 9/2014 | Izumi et al. |
| 8,895,118 B2 | 11/2014 | Geivandov et al. |
| 8,929,054 B2 | 1/2015 | Felten et al. |
| 8,938,160 B2 | 1/2015 | Wang |
| 9,056,676 B1 | 6/2015 | Wang |
| 9,293,260 B2 | 3/2016 | Schmid et al. |
| 9,589,727 B2 | 3/2017 | Lazarev |
| 9,899,150 B2 | 2/2018 | Lazarev |
| 9,916,931 B2 * | 3/2018 | Lazarev .................. H01G 4/14 |
| 9,978,517 B2 | 5/2018 | Lazarev et al. |
| 10,153,087 B2 | 12/2018 | Lazarev et al. |
| 2002/0027220 A1 | 3/2002 | Wang et al. |
| 2002/0048140 A1 | 4/2002 | Gallay et al. |
| 2003/0026063 A1 | 2/2003 | Munshi |
| 2003/0102502 A1 | 6/2003 | Togashi |
| 2003/0103319 A1 | 6/2003 | Kumar et al. |
| 2003/0105365 A1 | 6/2003 | Smith et al. |
| 2003/0142461 A1 | 7/2003 | Decker et al. |
| 2003/0160595 A1 | 8/2003 | Provanzana et al. |
| 2003/0219647 A1 | 11/2003 | Wariishi |
| 2004/0173873 A1 | 9/2004 | Kumar et al. |
| 2004/0222413 A1 | 11/2004 | Hsu et al. |
| 2004/0223291 A1 | 11/2004 | Naito et al. |
| 2005/0118083 A1 | 6/2005 | Tabuchi |
| 2006/0120014 A1 | 6/2006 | Nakamura et al. |
| 2006/0120020 A1 | 6/2006 | Dowgiallo |
| 2007/0001258 A1 | 1/2007 | Aihara |
| 2007/0108940 A1 | 5/2007 | Sainomoto et al. |
| 2007/0159767 A1 | 7/2007 | Jamison et al. |
| 2007/0181973 A1 | 8/2007 | Hung et al. |
| 2008/0002329 A1 | 1/2008 | Pohm et al. |
| 2008/0008949 A1 | 1/2008 | Wu et al. |
| 2008/0150484 A1 | 6/2008 | Kimball et al. |
| 2008/0266750 A1 | 10/2008 | Wu et al. |
| 2008/0283283 A1 | 11/2008 | Abe et al. |
| 2009/0040685 A1 | 2/2009 | Hiemer et al. |
| 2009/0184355 A1 | 7/2009 | Brederlow et al. |
| 2010/0011656 A1 | 1/2010 | Gessner et al. |
| 2010/0038629 A1 | 2/2010 | Lazarev |
| 2010/0085521 A1 | 4/2010 | Kasianova et al. |
| 2010/0172066 A1 | 7/2010 | Baer et al. |
| 2010/0178728 A1 | 7/2010 | Zheng et al. |
| 2010/0183919 A1 | 7/2010 | Holme et al. |
| 2010/0193777 A1 | 8/2010 | Takahashi et al. |
| 2010/0214719 A1 | 8/2010 | Kim et al. |
| 2010/0233491 A1 | 9/2010 | Nokel et al. |
| 2010/0255381 A1 | 10/2010 | Holme et al. |
| 2010/0269731 A1 | 10/2010 | Jespersen et al. |
| 2010/0309606 A1 | 12/2010 | Allers et al. |
| 2010/0309696 A1 | 12/2010 | Guillot et al. |
| 2010/0315043 A1 | 12/2010 | Chau |
| 2011/0006393 A1 | 1/2011 | Cui |
| 2011/0042649 A1 | 2/2011 | Duvall et al. |
| 2011/0079733 A1 | 4/2011 | Langhals et al. |
| 2011/0079773 A1 | 4/2011 | Wasielewski et al. |
| 2011/0110015 A1 | 5/2011 | Zhang et al. |
| 2011/0149393 A1 | 6/2011 | Nokel et al. |
| 2011/0228442 A1 | 9/2011 | Zhang et al. |
| 2012/0008251 A1 | 1/2012 | Yu et al. |
| 2012/0033342 A1 | 2/2012 | Ito et al. |
| 2012/0053288 A1 | 3/2012 | Morishita et al. |
| 2012/0056600 A1 | 3/2012 | Nevin |
| 2012/0059307 A1 | 3/2012 | Harris et al. |
| 2012/0113380 A1 | 5/2012 | Geivandov et al. |
| 2012/0122274 A1 | 5/2012 | Lazarev |
| 2012/0244330 A1 | 9/2012 | Sun et al. |
| 2012/0268862 A1 | 10/2012 | Song et al. |
| 2012/0274145 A1 | 11/2012 | Taddeo |
| 2012/0302489 A1 | 11/2012 | Rodrigues et al. |
| 2013/0056720 A1 | 3/2013 | Kim et al. |
| 2013/0187475 A1 | 7/2013 | Vendik et al. |
| 2013/0194716 A1 | 8/2013 | Holme et al. |
| 2013/0215535 A1 | 8/2013 | Bellomo |
| 2013/0224473 A1 | 8/2013 | Tassell et al. |
| 2013/0314839 A1 | 11/2013 | Terashima et al. |
| 2013/0342967 A1 | 12/2013 | Lai et al. |

(56) References Cited

U.S. PATENT DOCUMENTS

| | | |
|---|---|---|
| 2014/0035100 A1 | 2/2014 | Cho |
| 2014/0036410 A1 | 2/2014 | Okamatsu et al. |
| 2014/0098458 A1 | 4/2014 | Almadhoun et al. |
| 2014/0158340 A1 | 6/2014 | Dixler et al. |
| 2014/0169104 A1 | 6/2014 | Kan et al. |
| 2014/0185260 A1 | 7/2014 | Chen et al. |
| 2014/0268490 A1 | 9/2014 | Tsai et al. |
| 2014/0316387 A1 | 10/2014 | Harris et al. |
| 2014/0347787 A1 | 11/2014 | Fathi et al. |
| 2015/0008671 A1 | 1/2015 | Rentero et al. |
| 2015/0008735 A1 | 1/2015 | Mizoguchi |
| 2015/0010849 A1 | 1/2015 | Elabd et al. |
| 2015/0158392 A1 | 6/2015 | Zhao |
| 2015/0162131 A1 | 6/2015 | Felten et al. |
| 2015/0249401 A1 | 9/2015 | Eriksen et al. |
| 2015/0302990 A1 | 10/2015 | Ghosh et al. |
| 2016/0001662 A1 | 1/2016 | Miller et al. |
| 2016/0020026 A1 | 1/2016 | Lazarev |
| 2016/0020027 A1 | 1/2016 | Lazarev |
| 2016/0254092 A1 | 9/2016 | Lazarev et al. |
| 2016/0314901 A1 | 10/2016 | Lazarev |
| 2016/0340368 A1 | 11/2016 | Lazarev |
| 2016/0379757 A1 | 12/2016 | Robinson et al. |
| 2017/0117097 A1 | 4/2017 | Furuta et al. |
| 2017/0133167 A1 | 5/2017 | Keller et al. |
| 2017/0232853 A1 | 8/2017 | Lazarev et al. |
| 2017/0233528 A1 | 8/2017 | Sharp et al. |
| 2017/0236641 A1 | 8/2017 | Furuta et al. |
| 2017/0236642 A1 | 8/2017 | Furuta et al. |
| 2017/0236648 A1 | 8/2017 | Lazarev et al. |
| 2017/0237271 A1 | 8/2017 | Kelly-Morgan et al. |
| 2017/0237274 A1 | 8/2017 | Lazarev et al. |
| 2017/0287637 A1 | 10/2017 | Lazarev et al. |
| 2017/0287638 A1 | 10/2017 | Lazarev et al. |
| 2017/0301467 A1 | 10/2017 | Lazarev et al. |
| 2018/0033554 A1* | 2/2018 | Li .......................... H01G 9/04 |
| 2018/0061582 A1 | 3/2018 | Furuta et al. |
| 2018/0122143 A1 | 5/2018 | Ellwood |
| 2018/0126857 A1 | 5/2018 | Kelly-Morgan |
| 2018/0137978 A1 | 5/2018 | Hein et al. |
| 2018/0137984 A1 | 5/2018 | Furuta et al. |
| 2018/0158616 A1 | 6/2018 | Lazarev et al. |

FOREIGN PATENT DOCUMENTS

| | | |
|---|---|---|
| CN | 100449661 | 1/2009 |
| CN | 1748271 B | 6/2010 |
| CN | 102426918 A | 4/2012 |
| CN | 103261370 A | 8/2013 |
| CN | 203118781 U | 8/2013 |
| CN | 203377785 U | 1/2014 |
| CN | 103755703 A | 4/2014 |
| CN | 103986224 A | 8/2014 |
| CN | 103258656 B | 8/2015 |
| DE | 10203918 A1 | 8/2003 |
| DE | 102010012949 A1 | 9/2011 |
| DE | 102011101304 A1 | 11/2012 |
| DE | 102012016438 A1 | 2/2014 |
| EP | 0493716 A1 | 7/1992 |
| EP | 0585999 A1 | 3/1994 |
| EP | 0602654 A1 | 6/1994 |
| EP | 0729056 A1 | 8/1996 |
| EP | 0791849 A1 | 8/1997 |
| EP | 0986080 A3 | 1/2004 |
| EP | 0865142 B1 | 5/2008 |
| EP | 2062944 A1 | 5/2009 |
| EP | 2108673 A1 | 10/2009 |
| EP | 2415543 A1 | 2/2012 |
| EP | 1486590 B1 | 12/2013 |
| EP | 2759480 A1 | 7/2014 |
| EP | 1990682 B1 | 1/2015 |
| GB | 547853 A | 9/1942 |
| GB | 963148 A | 4/1963 |
| GB | 2084585 B | 11/1983 |
| JP | S6386731 A | 4/1988 |
| JP | H03253014 A | 11/1991 |
| JP | 2786298 B2 | 8/1998 |
| JP | 2000100484 A | 4/2000 |
| JP | 2001093778 A | 4/2001 |
| JP | 2007287829 A | 11/2007 |
| JP | 2010106225 A | 5/2010 |
| JP | 2010160989 A | 7/2010 |
| JP | 2011029442 A | 2/2011 |
| JP | 2014139296 A | 7/2014 |
| RU | 2199450 C1 | 2/2003 |
| RU | 2512880 C2 | 4/2014 |
| WO | 1990009616 A1 | 8/1990 |
| WO | 0139305 A1 | 5/2001 |
| WO | 2002026774 A2 | 4/2002 |
| WO | 2007078916 A2 | 7/2007 |
| WO | 2008038047 A2 | 4/2008 |
| WO | 2009144205 A1 | 12/2009 |
| WO | 2009158553 A2 | 12/2009 |
| WO | 2009158553 A3 | 3/2010 |
| WO | 2011056903 A1 | 5/2011 |
| WO | 2011137137 A1 | 11/2011 |
| WO | 2012012672 A2 | 1/2012 |
| WO | 2012084536 A1 | 6/2012 |
| WO | 2012122312 A1 | 9/2012 |
| WO | 2012142460 A1 | 10/2012 |
| WO | 2012162500 A2 | 11/2012 |
| WO | 2013009772 A1 | 1/2013 |
| WO | 2013085467 A1 | 6/2013 |
| WO | 2014009686 A1 | 1/2014 |
| WO | 2015003725 A1 | 1/2015 |
| WO | 2015175522 A1 | 11/2015 |
| WO | 2015175558 A2 | 11/2015 |

OTHER PUBLICATIONS

Co-Pending U.S. Appl. No. 15/368,171, to Lazarev et al., filed Dec. 2, 2016.
Co-Pending U.S. Appl. No. 15/430,307, to Lazarev et al, filed Feb. 10, 2017.
Co-Pending U.S. Appl. No. 15/449,587, to Lazarev et al., filed Mar. 3, 2017.
Co-Pending U.S. Appl. No. 15/675,614, to Kelly-Morgan, filed Aug. 11, 2017
Co-Pending U.S. Appl. No. 15/710,587, to Li et al, filed Sep. 20, 2017.
Co-Pending U.S. Appl. No. 15/469,126, to Lazarev et al, filed Mar. 24, 2017.
D C Tiwari, et al: "Temperature dependent studies of electric and dielectric properties of polythiophene based nano composite", Indian Journal of Pure & Applied Physicsvol. 50, Jan. 2012. pp. 49-56.
Extended European Search Report. 15792494.5, dated Dec. 11, 2017.
Extended European Search Report for Application No. 15792405.1, dated Nov. 10, 2017.
Final Office Action for U.S. Appl. No. 15/043,247, dated Oct. 4, 2017.
Final Office Action for U.S. Appl. No. 15/043,249, dated Feb. 6, 2018.
Final Office Action for U.S. Appl. No. 15/194,224, dated Jan. 30, 2018.
Hsing-Yang Tsai et al, "1,6- and 1,7-Regioisomers of Asymmetric and Symmetric Perylene Bisimides: Synthesis, Characterization and Optical Properties" Molecules, 2014, vol. 19, pp. 327-341.
Hsing-Yang Tsai et al, "Synthesis and optical properties of novel asymmetric perylene bisimides", Journal of Luminescence, Vole 149, pp. 103-111 (2014).
International Search Report and Written Opinion for International Application No. PCT/US2016/019641, dated Jul. 12, 2016.
Non-Final for U.S. Appl. No. 15/043,186, dated Feb. 14, 2018.
Non-Final Office Action for U.S. Appl. No. 15/043,315, dated Dec. 26, 2017.
Non-Final Office Action for U.S. Appl. No. 15/090,509, dated Jun. 22, 2017.
Non-Final Office Action for U.S. Appl. No. 15/163,595, dated Jan. 17, 2018.

(56) References Cited

OTHER PUBLICATIONS

Notice of Allowance for U.S. Appl. No. 14/710,480, dated Nov. 24, 2017.
Notice of Allowance for U.S. Appl. No. 14/710,480, dated Jan. 11, 2018.
Notice of Allowance for U.S. Appl. No. 14/719,072, dated Nov. 16, 2017.
Notice of Allowance for U.S. Appl. No. 14/752,600, dated Nov. 24, 2017.
Notice of Allowance for U.S. Appl. No. 14/752,600, dated Dec. 4, 2017.
Notice of Allowance for U.S. Appl. No. 14/919,337, dated Nov. 8, 2017.
Notice of Allowance for U.S. Appl. No. 14/931,757, dated Dec. 29, 2017.
Notice of Allowance for U.S. Appl. No. 14/931,757, dated Feb. 8, 2018.
Notice of Allowance for U.S. Appl. No. 14/931,757, dated Oct. 31, 2017.
Notice of Allowance for U.S. Appl. No. 15/090,509, dated Jan. 24, 2018.
Office Action dated Dec. 13, 2017 for Taiwan Patent Application No. 106104499.
Office Action dated Dec. 13, 2017 for Taiwan Patent Application No. 106104500.
Office Action dated Jan. 25, 2018 for Chinese patent application No. 20158005146.4.
Taiwan Office Action for TW Application No. 106104501, dated Oct. 19, 2017.
Updated Notice of Allowance for U.S. Appl. No. 14/710,480, dated Jan. 17, 2018.
Center for Dielectric Studies, Janosik, et al., "Ultra-High Energy Density Capacitors Through Improved Glass Technology", pp. 1-5 Center for Dielectric Studies Penn State University, dated 2004.
Chao-Hsien Ho et al., "High dielectric constant polyaniline/poly(acrylic acid) composites prepared by in situ polymerization", Synthetic Metals, vol. 158, pp. 630-637 (2008).
Congressional Research Service, Paul W. Parfomak, "Energy Storage for Power Grids and Electric Transportation: A Technology Assessment", pp. 87-94; Members and Committees of Congress; Mar. 27, 2012.
Deily, Dielectric and Optical Characterization of Polar Polymeric Materials: Chromophore Entrained PMMA Thin Films, Thesis, 2008.
Department of Chemistry and Biochemistry, Hardy, et al. "Converting an Electrical Insulator into a Dielectric Capacitor: End-Capping Polystyrene with Oligoaniline"; pp. 799-807, Rensselaer Polytechnic Institute, Troy, New York 12180; Feb. 17, 2013.
Department of Chemistry, Ho et al., "High dielectric constant polyanilinelpoly(acrylic acid) composites prepared by in situ polymerization", pp. 630-637; National Taiwan University, Taipei, Taiwan, ROC, Apr. 15, 2008.
Deruiter, J. Resonance and Induction Tutorial. Auburn University-Principles of Drug Action 1 Course Material. Spring 2005, 19 pages.
Final Office Action for U.S. Appl. No. 14/919,337, dated May 1, 2017.
Handy, Scott T. "Ionic Liquids-Classes and Properties" Published Sep. 2011, Accessed Aug. 28, 2017, InTechweb.org.
Henna Ruuska et al., "A Density Functional Study on Dielectric Properties of Acrylic Acid Crafted Polypropylene", The Journal of Chemical Physics, vol. 134, p. 134904 (2011).
Hindawi Publishing Corporation, Chavez-Castillo et al, "Third-Order Nonlinear Optical Behavior of Novel Polythiophene Derivatives Functionalized with Disperse Red 19 Chromophore", pp. 1-11, International Journal of Polymer Science vol. 2015, Article ID 219361, Mar. 12, 2015.
Hindawi Publishing Corporation, Gonzalez-Espasandfn et al., "Fuel Cells: A Real Option for Unmanned Aerial Vehicles Propulsion", pp. 1-13, Torrej'on de Ardoz, 28850 Madrid, Spain Jan. 30, 2014.
Hindawi Publishing Corporation, Khalil Ahmed et al., "High dielectric constant polyaniline/poly(acrylic acid) composites prepared by in situ polymerization", pp. 630-637, University of the Punjab, New Campus, Lahore 54590, Oct. 17, 2015.
Institute of Transportation Studies, Burke, et al. "Review of the Present and Future Applications of Supercapacitors in Electric and Hybrid Vehicles", pp. 2-23 UC Davis ITS; Dec. 2014.
International Application No. PCT/US/15/58890, to Pavel Ivan Lazarev, et al., filed Nov. 3, 2015.
International Search Report and Written Opinion for International Application No. PCT/US2015/030356, dated Jul. 28, 2015.
International Search Report and Written Opinion for International Application No. PCT/US2015/030415, dated Nov. 4, 2015.
International Search Report and Written Opinion for International Application No. PCT/US2015/058890, dated Feb. 25, 2016.
International Search Report and Written Opinion for International Application No. PCT/US2016/033628, dated Sep. 1, 2016.
International Search Report and Written Opinion for International Application No. PCT/US2016/039395, dated Jul. 1, 2016.
International Search Report and Written Opinion for International Application No. PCT/US2016/039395, dated Oct. 20, 2016.
International Search Report and Written Opinion for International Application No. PCT/US2016/57765, dated Jan. 5, 2017.
International Search Report and Written Opinion for International Application No. PCT/US2017/016862, dated Aug. 14, 2017.
International Search Report and Written Opinion for International Application No. PCT/US2017/017146, dated May 11, 2017.
International Search Report and Written Opinion for International Application No. PCT/US2017/017150, dated May 18, 2017.
International Search Report and Written Opinion for International Application No. PCT/US2017/24150, dated Jun. 21, 2017.
International Search Report and Written Opinion for International Application No. PCT/US2017/24371, dated Aug. 2, 2017.
International Search Report and Written Opinion for International Application No. PCT/US2017/24600, Aug. 14, 2017.
International Search Report and Written Opinion dated Feb. 25, 2016 for International Application No. PCT/US15/58890, to Pavel Ivan Lazarev, filed Nov. 3, 2015.
International Search Report and Written Opinion dated Jul. 12, 2016 for International Application No. PCT/US2016/019641, to Pavel Ivan Lazarev, filed Feb. 25, 2016.
International Search Report and Written Opinion dated Oct. 20, 2016 International Application No. PCT/US2016/039395, to Matthew R. Robinson, et al., filed Jun. 24, 2016.
International Search Report and Written Opinion dated Sep. 1, 2016 for International Application No. PCT/US2016/033628, to Pavel Ivan Lazarev, filed Sep. 1, 2016.
International Union of Pure and Applied Chemistry Polymer Divison Stejskal et al., "Polyaniline: Thin Films and Colloidal Dispersions (IUPAC Technical Report)", vol. 77, No. 5, pp. 815-826, Russian Academy of Sciences, St. Petersburg 199004, Russia; 2005.
Isoda, Kyosuke et al. "Truxene-Based Columnar Liquid Crystals: Self-Assembled Structures and Electro-Active Properties." Chemistry—An Asian Journal (2009), vol. 4, No. 10, pp. 1619-1625.
JACS Articles, Kang et. al., "Ultralarge Hyperpolarizability Twisted π-Electron System Electra-Optic Chromophores: Synthesis, Solid-State and Solution-Phase Structural Characteristics, Electronic Structures, Linear and Nonlinear Optical Properties, and Computational Studies", pp. 3267-3286; Perugia, Italy Feb. 20, 2007.
Jaroslav Stejskal and Irina Sapurina, "Polyaniline: Thin Films and Colloidal Dispersions (IUPAC Technical Report)", Pure and Applied Chemistry, vol. 77, No. 5, pp. 815-826 (2005).
Johnson, Kieth E. "What's an Ionic Liquid?" The Electrochemical Society Interface, Published Spring 2007, pp. 38-41, Accessed Aug. 28, 2017.
Kontrakt Technology Limited, Alla Sakharova, PhD., "Cryscade Solar Limited: Intellectual Property Portfolio summary", pp. 1-3, Cryscade Solar Limited; Apr. 9, 2015.
Li, Li-Li et al. "Synthesis and Mesomorphism of Ether-ester Mixed Tail C3-symmetrical Truxene discotic liquid crystals." Liquid Crystals(2010), vol. 37, No. 5, pp. 499-506.

(56) References Cited

OTHER PUBLICATIONS

Liang, Mao et al. "Synthesis and Photovoltaic Performance of Two Triarylamine Organic Dyes Based on Truxene." Yinyong Huaxue (2011) vol. 28 No. 12, pp. 1387-1392.
Lu, Meng et al. "Organic Dyes Incorporating Bis-hexapropyltruxeneamino Moiety for efficient Dye-sensitized Solar Cells." Journal of Physical Chemistry C (2011) vol. 115, No. 1, pp. 274-281.
Maddalena, Francesco "Why are Ionic Liquids, Liquids?" http://www.quora.com/why-are-ionic-liquids-liquids?, Published Jan 26, 2017, Accessed Aug. 28, 2017.
Manukian, BK. 216. IR.-spektroskopische Untersuchungen in der Imidazol-Reihe. Helvetica Chimica Acta. 1965, vol. 48, p. 2001.
Microelectronics Research and Communications Institute, Founders et al., "High-Voltage Switching Circuit for Nanometer Scale CMOS Technologies", pp. 1-4, University of Idaho, Moscow, ID 83843 USA, Apr. 30, 2007.
Molecular Diversity Preservation International, Barber, et al. "Polymer Composite and Nanocomposite Dielectric Materials for Pulse Power Energy Storage" pp. 1-32; 29 University of South Carolina, Columbia, SC 29208 Oct. 2009.
Nagabrahmandachari et al. "Synthesis and Spectral Analysis of Tin Tetracarboxylates and Phosphinates" Indian Journal of Chemistry—Section A, 1995, vol. 34A, pp. 658-660.
Ni, Hai-Lang et al. "Truxene Discotic Liquid Crystals with Two Different Ring Substituents: Synthesis, Metamorphosis and High Charged Carrier Mobility." Liquid Crystals, vol. 40, No. 3, pp. 411-420.
Non-Final Office Action dated Jun. 13, 2017 for U.S. Appl. No. 15/163,595.
Non-Final Office Action for U.S. Appl. No. 14/719,072, dated Aug. 2, 2017.
Non-Final Office Action for U.S. Appl. No. 15/043,247, dated Jun. 22, 2017.
Non-Final Office Action for U.S. Appl. No. 15/053,943, dated Apr. 19, 2017.
Non-Final Office Action for U.S. Appl. No. 15/194,224, dated Sep. 27, 2017.
Non-Final Office Action for U.S. Appl. No. 14/710,480, dated May 8, 2017.
Non-Final Office Action for U.S. Appl. No. 14/752,600, dated Jan. 23, 2017.
Non-Final Office Action for U.S. Appl. No. 14/919,337, dated Jan. 4, 2017.
Non-Final Office Action for U.S. Appl. No. 15/043,186, dated Jun. 2, 2017.
Notice of Allowance for U.S. Appl. No. 14/710,480, dated Oct. 6, 2017.
Notice of Allowance for U.S. Appl. No. 14/710,491, dated Oct. 24, 2016.
Notice of Allowance for U.S. Appl. No. 14/752,600, dated Jul. 27, 2017.
Notice of Allowance for U.S. Appl. No. 14/919,337, dated Jul. 19, 2017.
Notice of Allowance for U.S. Appl. No. 14/931,757, dated Jul. 17, 2017.
Notice of Allowance for U.S. Appl. No. 15/053,943, dated Aug. 14, 2017.
Optical Society of America, Kuzyk et al, "Theory of Molecular Nonlinear Optics", pp. 5, 4-82, Department of Physics and Astronomy, Washington State University, Pullman, Washington 99164-2814, USA, Mar. 26, 2013.
Philosophical Transactions of the Royal Society, Simon, "Charge storage mechanism in nanoporous carbons and its consequence for electrical double layer capacitors" pp. 3457-3467; Drexel University, Philadelphia, PA 19104, 2010.
PUBCHEM Open Chemistry Database, Compound Summary for CID 91001799. Mar. 17, 2015. pp. 1-10.
R. J. Baker and B. P. Johnson, "stacking power MOSFETs for use in high speed instrumentation", Department of Electrical Engineering, University of Nevada, Reno, Reno. Nevada 89557-0030; pp. 5799-5801 Aug. 3, 1992.
Roger D. Hartman and Herbert A. Pohl, "Hyper-electronic Polarization in Macromolecular Solids", Journal of Polymer Science: Part A-1, vol. 6, pp. 1135-1152 (1968).
RSC Publishing, Akl et al., "Molecular materials for switchable nonlinear optics in the solid state, based on ruthenium-nitrosyl complexes", pp. 3518-3527, Porto Alegre, Brazil; May 24, 2013.
Trevethan, Thomas et al. "Organic Molecules Reconstruct Nanostructures on Ionic Surfaces." Small (2011), vol. 7, No. 9, pp. 1264-1270.
U.S. Appl. No. 14/719,072, to Pavel Ivan Lazarev, filed May 21, 2015.
U.S. Appl. No. 14/752,600, to Matthew R. Robinson, et al., filed Jun. 26, 2015.
U.S. Appl. No. 14/919,337, to Paul T. Furuta, et al., filed Oct. 21, 2015.
U.S. Appl. No. 14/931,757, to Pavel Ivan Lazarev, et al., filed Nov. 3, 2015.
U.S. Appl. No. 15/043,186, to Paul T. Furuta, et al., filed Feb. 12, 2016.
U.S. Appl. No. 15/043,209, to Paul T. Furuta, et al., filed Feb. 12, 2016.
U.S. Appl. No. 15/043,247, to Barry K Sharp, et al., filed Feb. 12, 2016.
U.S. Appl. No. 15/043,315, to Ian S.G. Kelly-Morgan, filed Feb. 12, 2014.
U.S. Appl. No. 15/043,315, to Ivan S.G. Kelley-Morgan, filed Feb. 12, 2016.
U.S. Appl. No. 15/053,943, to Pavel Ivan Lazarev, et al., filed Mar. 14, 2016.
U.S. Appl. No. 15/090,509, to Pavel Ivan Lazarev, et al., filed Mar. 4, 2016.
U.S. Appl. No. 62/121,328, to Pavel Ivan Lazarev et al., filed Feb. 26, 2015.
U.S. Appl. No. 62/294,949, to Pavel Ivan Lazarev, et al., filed Feb. 12, 2016.
U.S. Appl. No. 62/294,955, to Pavel Ivan Lazarev, et al., filed Feb. 12, 2016.
U.S. Appl. No. 62/294,964, to Pavel Ivan Lazarev, et al., filed Feb. 12, 2016.
U.S. Appl. No. 62/318,134, to Pavel Ivan Lazarev, et al., filed Mar. 4, 2016.
Warmerdam, T. W. et al. "Discotic Liquid Crystals. Physical Parameters of some 2, 3, 7, 8, 12, 13-hexa(alkanoyloxy) truxenes: Observation of a Reentrant Isotropic Phase in a Pure Disk-like mesogen." Liquid Crystals (1988), vol. 3, No. 8, pp. 1087-1104.
Yue Wang, et. al., "Morphological and Dimensional Control via Hierarchical Assembly of Doped Oligoaniline Single Crystals", J. Am. Chem. Soc. 2012, 134, pp. 9251-9262.
Extended European Search Report dated Aug. 8, 2018 for European Patent Application No. 16756391.5.
Extended European Search Report dated Sep. 24, 2018 for European Patent Application No. 15856609.1.
Extended European Search Report dated Sep. 26, 2018 for European Patent Application No. 16797411.2.
Final Office Action dated Feb. 14, 2018 for U.S. Appl. No. 15/043,186.
Final Office Action dated May 2, 2017.
Final Office Action for U.S. Appl. No. 15/043,247, dated Oct. 24, 2018.
Final Office Action for U.S. Appl. No. 15/043,315, dated Jun. 7, 2018.
Final Office Action for U.S. Appl. No. 15/449,587, dated Oct. 10, 2018.
Final Office Action for U.S. Appl. No. 15/710,587, dated Nov. 6, 2018.
International Search Report and Written Opinion dated Jul. 31, 2017 for International Patent Application PCT/US2017/024589.
International Search Report and Written Opinion dated Feb. 23, 2018 for International Patent Application No. PCT/US17/64252.

(56) References Cited

OTHER PUBLICATIONS

International Search Report and Written Opinion dated Jun. 7, 2017 for International Application No. PCT/US2017/24589, to Pavel Ivan Lazarev, filed Jun. 7, 2017.
M. Jurow et al, "Porphyrins as molectular electronic components of functional devices", Coordination Chemistry Reviews, Elsevier Science, Amsterdam NL, vol. 254, No. 19-20, Oct. 1, 2010, pp. 2297-2310.
Non-Final Office Action for U.S. Appl. No. 15/043,247, dated Jun. 7, 2018.
Non-Final Office Action for U.S. Appl. No. 15/430,339, dated Jul. 11, 2018.
Non-Final Office Action for U.S. Appl. No. 15/430,307, dated Jul. 16, 2018.
Non-Final Office Action for U.S. Appl. No. 15/449,587, dated May 21, 2018.
Non-Final Office Action for U.S. Appl. No. 15/710,587, dated Jul. 3, 2018.
Non-Final Office Action for U.S. Appl. No. 15/801,240, dated Oct. 19, 2018.
Non-Final Office Action for U.S. Appl. No. 15/805,016, dated Jun. 4, 2018.
Non-Final/Final Office Action for U.S. Appl. No. 15/043,247, dated Feb. 20, 2018.
Non-Final/Final Office Action for U.S. Appl. No. 15/430,391, dated Jul. 20, 2018.
Notice of Allowance for U.S. Appl. No. 14/919,337, dated Mar. 5, 2018.
Notice of Allowance for U.S. Appl. No. 15/163,595, dated Jul. 30, 2018.
Office Action dated May 18, 2018 for Chinese Patent Application for Invention No. 201580025110.
Search Report and Written Opinion dated Feb. 7, 2018 for Singapore Patent Application No. 11201609435W.
Taiwanese Office Action for 886103 Application No. 106142206, dated Jul. 5, 2018.
International Search Report and Written Opinion dated Mar. 21, 2019 for International Patent Application No. PCT/US2018/061784.
Non-Final Office Action for U.S. Appl. No. 15/043,247, dated Feb. 19, 2019.
Non-Final Office Action for U.S. Appl. No. 15/469,126, dated Apr. 17, 2019.
Non-Final Office Action for U.S. Appl. No. 15/675,594, dated Apr. 19, 2019.
Non-Final Office Action for U.S. Appl. No. 15/870,504, dated Feb. 27, 2019.
Non-Final Office Action for U.S. Appl. No. 15/944,517, dated Apr. 19, 2019.
Notice of Allowance for U.S. Appl. No. 15/043,315, dated Feb. 21, 2019.
Notice of Allowance for U.S. Appl. No. 15/368,171, dated Apr. 10, 2019.
Notice of Allowance for U.S. Appl. No. 15/449,524, dated Feb. 21, 2019.
Notice of Allowance for U.S. Appl. No. 15/801,240, dated Feb. 11, 2019.
Yang Zhao et al, "Theoretical study of one-photon and two-photon absorption properties of plerylenetetracarboxylic lerivatives", The Journal of Chemical Physics 129, 014301 (2008).

* cited by examiner

SOLID MULTILAYER STRUCTURE AS SEMIPRODUCT FOR META-CAPACITOR

CLAIM OF PRIORITY

This application is a continuation in part of U.S. patent application Ser. No. 15/449,524 filed Mar. 3, 2017, the entire contents of which are incorporated herein by reference. U.S. patent application Ser. No. 15/449,524 is a continuation in part of U.S. patent application Ser. No. 14/710,491 filed May 12, 2015, now U.S. Pat. No. 9,589,727 issued Mar. 7, 2017, the entire contents of which are incorporated herein by reference. U.S. patent application Ser. No. 14/710,491 claims the priority benefit of U.S. Provisional Patent Application No. 61/991,871 filed May 12, 2014, the entire contents of which are incorporated herein by reference. This application is a continuation in part of U.S. patent application Ser. No. 14/710,480 filed May 12, 2015 (published as U.S. Patent Application Publication 2016/0020026 on Jan. 21, 2016, the entire contents of which are incorporated herein by reference. U.S. patent application Ser. No. 14/710,480 claims the priority benefit of U.S. Provisional Patent Application No. 61/991,861 filed May 12, 2014, the entire contents of which are incorporated herein by reference.

FIELD OF THE INVENTION

The present disclosure relates generally to passive components of electrical circuit and more particularly to a solid multilayer structure for meta-capacitor based on this structure and intended for energy storage.

BACKGROUND

A capacitor is a passive electronic component that is used to store energy in the form of an electrostatic field, and comprises a pair of electrodes separated by a dielectric layer. When a potential difference exists between two electrodes, an electric field is present in the dielectric layer. In practice, the dielectric layer between electrodes passes a small amount of leakage current.

A characteristic electric field known as the breakdown strength $E_{bd}$, is an electric field in which the dielectric layer in a capacitor becomes conductive. Voltage at which this occurs is called the breakdown voltage of the device, and is given by the product of dielectric strength and separation between the electrodes, $$V_{bd} = E_{bd} d$$

The maximal volumetric energy density stored in the capacitor is limited by the value proportional to $\sim \varepsilon \cdot E^2_{bd}$, where E is dielectric permittivity and $E_{bd}$ is breakdown strength. Thus, in order to increase the stored energy of the capacitor it is necessary to increase dielectric permeability $\varepsilon$ and breakdown strength $E_{bd}$ of the dielectric layer.

For high voltage applications, much larger capacitors have to be used. There are a number of factors that can dramatically reduce the breakdown voltage. Geometry of the conductive electrodes is important for these applications. In particular, sharp edges or points hugely increase the electric field strength locally and can lead to a local breakdown. Once a local breakdown starts at any point, the breakdown will quickly "trace" through the dielectric layer till it reaches the opposite electrode and causes a short circuit.

Breakdown of the dielectric layer usually occurs as follows. Intensity of an electric field becomes high enough free electrons from atoms of the dielectric material and make them conduct an electric current from one electrode to another. Presence of impurities in the dielectric or imperfections of the crystal structure can result in an avalanche breakdown as observed in semiconductor devices.

Other important characteristic of a dielectric material is its dielectric permittivity and resistivity. Different types of dielectric materials are used for capacitors and include ceramics, polymer film, paper, and electrolytic capacitors of different kinds. The most widely used polymer film materials are polypropylene and polyester. Increase of dielectric permittivity while maintaining high resistivity of film capacitor dielectrics allows increasing of volumetric energy density which makes it an important technical task.

An ultra-high dielectric constant composite of polyaniline, PANI-DBSA/PAA, was synthesized using in situ polymerization of aniline in an aqueous dispersion of polyacrylic acid (PAA) in the presence of dodecylbenzene sulfonate (DBSA) (see, Chao-Hsien Hoa et al., "High dielectric constant polyaniline/poly(acrylic acid) composites prepared by in situ polymerization", Synthetic Metals 158 (2008), pp. 630-637). The water-soluble PAA served as a polymeric stabilizer, protecting the PANI particles from macroscopic aggregation. A very high dielectric constant of ca. $2.0*10^5$ (at 1 kHz) was obtained for the composite containing 30% PANI by weight. Influence of the PANI content on the morphological, dielectric and electrical properties of the composites was investigated. Frequency dependence of dielectric permittivity, dielectric loss, loss tangent and electric modulus were analyzed in the frequency range from 0.5 kHz to 10 MHz. SEM micrograph revealed that composites with high PANI content (i.e., 20 wt. %) consisted of numerous nano-scale PANI particles that were evenly distributed within the PAA matrix. High dielectric constants were attributed to the sum of the small capacitors of the PANI particles. The drawback of this material is a possible occurrence of percolation and formation of at least one continuous conductive path under electric field with probability of such an event increasing with an increase of the electric field. When at least one continuous path (track) through the neighboring conducting PANI particles is formed between electrodes of the capacitor, it decreases a breakdown voltage of such capacitor.

Colloidal polyaniline particles stabilized with a water-soluble polymer, poly(N-vinylpyrrolidone) [poly(1-vinylpyrrolidin-2-one)], have been prepared by dispersion polymerization. The average particle size, 241±50 nm, have been determined by dynamic light scattering (see, Jaroslav Stejskal and Irina Sapurina, "Polyaniline: Thin Films and Colloidal Dispersions (IUPAC Technical Report)", Pure and Applied Chemistry, Vol. 77, No. 5, pp. 815-826 (2005).

Single crystals of doped aniline oligomers are produced via a simple solution-based self-assembly method (see, Yue Wang, et. al., "Morphological and Dimensional Control via Hierarchical Assembly of Doped Oligoaniline Single Crystals", J. Am. Chem. Soc. 2012, 134, pp. 9251-9262). Detailed mechanistic studies reveal that crystals of different morphologies and dimensions can be produced by a "bottom-up" hierarchical assembly where structures such as one-dimensional (1-D) nanofibers can be aggregated into higher order architectures. A large variety of crystalline nanostructures, including 1-D nanofibers and nanowires, 2-D nanoribbons and nanosheets, 3-D nanoplates, stacked sheets, nanoflowers, porous networks, hollow spheres, and twisted coils, can be obtained by controlling the nucleation of the crystals and the non-covalent interactions between the doped oligomers. These nanoscale crystals exhibit enhanced conductivity compared to their bulk counterparts as well as interesting structure-property relationships such as shape-dependent crystallinity. Furthermore, the morphology and dimension of these structures can be largely rationalized and predicted by monitoring molecule-solvent interactions via absorption studies. Using doped tetra-aniline as a model system, the results and strategies presented in this article provide insight into the general scheme of shape and size control for organic materials.

There is a known a multilayer structure comprising blocking and dielectric layers. The first blocking layer is disposed on a dielectric layer, and the second blocking layer is disposed under a dielectric layer. Dielectric constants of the first and second blocking layers are both independently greater than the dielectric constant of the dielectric layer. A drawback of this device is that blocking layers of high dielectric permittivity can lead to destruction of the energy storage device. Materials with high dielectric permittivity which are based on composite materials and containing polarized particles (such as PANI particles) might demonstrate a percolation phenomenon. The formed polycrystalline structure of layers has multiple dangling chemical bonds on borders between crystallites. When the used material with high dielectric permittivity possesses polycrystalline structure percolation might occur along the borders of crystal grains. Another drawback of the known device is an expensive manufacturing procedure which is vacuum deposition of all layers.

The present invention solves a problem of the further increase of volumetric and mass density of reserved energy of the metacapacitor as energy storage device and based on disclosed solid multilayer structure, and at the same time reduces cost of materials and manufacturing process.

SUMMARY

The present disclosure provides a solid multilayer structure intended as a half-finished product for manufacturing of energy storage devices (e.g., metacapacitors).

In an aspect, the solid multilayer structure comprising a plurality of m polarization layers, and a plurality of m+1 insulating layers disposed in a repeating sequence with the plurality of the polarization layers. At least one polarization layer comprises a colloidal composite with a micro-dispersion of electro-conductive nano-particles in an insulator matrix, and m is a number greater than or equal to 1. The insulating layer has a breakdown voltage of at least not less than 0.01 volts (V) per nanometer (nm), the polarization layer has a dielectric permittivity greater than or equal to 100, and in some embodiments the multilayer film has a resistivity between about $10^{15}$ Ohm cm and $10^{22}$ Ohm cm.

DETAILED DESCRIPTION

Figure 1:
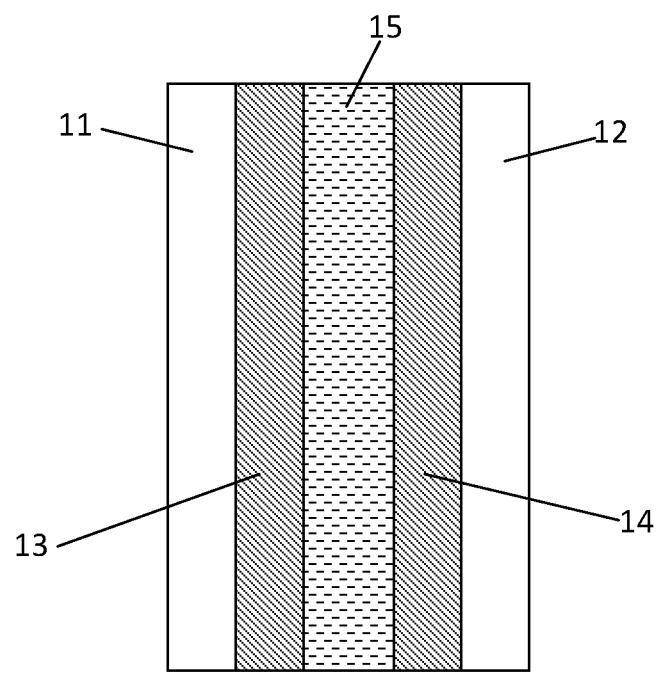
FIG. 1 schematically shows the one embodiment of the solid multilayer structure according to the present invention.

The general description of the present invention having been made, a further understanding can be obtained by reference to the specific preferred embodiments, which are given herein only for the purpose of illustration and are not intended to limit the scope of the appended claims.

The present invention provides a solid multilayer structure as disclosed hereinabove. In one embodiment of the present invention, at least one of the insulating layers is crystalline. The insulating layers may be fabricated from a material selected from crystalline material, poly-crystal material, semi-crystalline, aligned supramolecular structures (aligned mesogens), and amorphous material. Depending on the application, dielectric permittivity of the insulating dielectric material c may be in the broad range. The insulating layer comprises a material characterized by a band gap of greater than 4 eV and by breakdown field strength of greater than about 0.001 volts (V)/nanometer (nm), 0.01 V/nm, 0.05 V/nm, 0.1 V/nm, 0.2 V/nm, 0.3 V/nm, 0.4 V/nm, 0.5 V/nm, 1 V/nm, or 10 V/nm.

In some embodiments, the solid multilayer structure has a resistivity between about $10^{15}$ Ohm cm and $10^{22}$ Ohm cm. Still further, in some embodiments, the polarization layer may have a resistivity between $10^{15}$ Ohm cm and $10^{22}$ Ohm cm.

For the present invention, the insulating layers may possess a different structure in the range between an amorphous and crystalline solid layer, depending on the material and manufacturing procedure used. In one embodiment of the disclosed solid multilayer structure, the insulating layers comprise a material selected from organic polymers, composite organic oligomers, oxides, nitrides, oxynitrides and fluorides. In another embodiment of the disclosed capacitor, the insulating layers comprise a material selected from $SiO_2$, $HfO_2$, $Al_2O_3$ or $Si_3N_4$.

In some embodiments of the disclosed solid multilayer structure, the insulating layers comprise modified organic compounds independently selected from the list of Sharp polymers (as described in U.S. patent application Ser. No. 15/043,247, filed Feb. 12, 2016 and Ser. No. 14/919,337, filed Oct. 21, 2015), YanLi Polymers (as described in U.S. patent application Ser. No. 15/449,587, filed Mar. 3, 2017 and Ser. No. 15/710,587, Furuta polymers (as described in U.S. patent application Ser. No. 15/043,186, filed Feb. 12, 2016), para-Furuta polymers (as described in U.S. patent application Ser. No. 15/043,209, filed Feb. 12, 2016), Non-Linear Static Dielectrics (as described in U.S. patent application Ser. No. 15/090,509, filed Apr. 4, 2016 and Ser. No. 15/163,595, filed May 24, 2016), Electro-Polarizable compounds (as described in U.S. patent application Ser. No. 15/469,126), the entire contents of all of which are incorporated herein by reference.

In some embodiments of the disclosed solid multilayer structure, the insulating and polarization layers are comprised of the aforementioned organic compounds; wherein the polarization layers are comprised of polarizable moieties and the insulating layers are comprised of carbon chain moieties (resistive tails) of said organic compounds described in the above incorporated U.S. Patent Applications.

In some embodiments of the disclosed solid multilayer structure, the insulating layers comprise modified organic compounds of the general structural formula I: $\{Cor\}(M)_k$, (I) where Cor is a polycyclic organic compound with conjugated π-system, M are modifying functional groups; and k is the number of the modifying functional groups that is greater than or equal to zero. In another embodiment of the present invention, the polycyclic organic compound is selected from the list comprising chromophores comprising a rylene motif, azo-bridge conjugated chromophores, oligophenyl, imidazole, pyrazole, acenaphthene, triaizine, indanthrone and having a general structural formula selected from structures 1-43 as given in Table 1, and their derivative structures.

TABLE 1

Examples of the polycyclic organic compound for Cor in the insulating layers

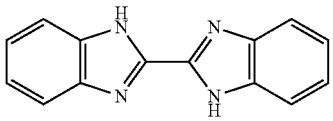 [SMILES: c1ccc2[nH]c(-c3nc4ccccc4[nH]3)nc2c1]
1

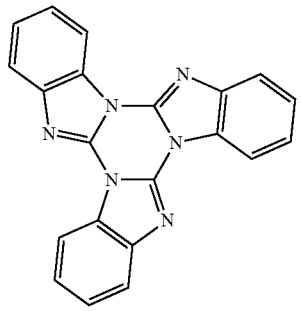 [SMILES: c1ccc2c(c1)nc1n2c2nc3ccccc3n2c2nc3ccccc3n12]
2

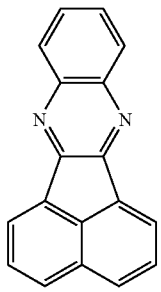 [SMILES: c1cc2c3c(cccc3c1)-c1nc3ccccc3nc1-2]
3

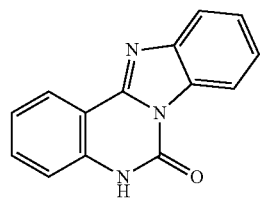 [SMILES: O=c1[nH]c2ccccc2c2nc3ccccc3n12]
4

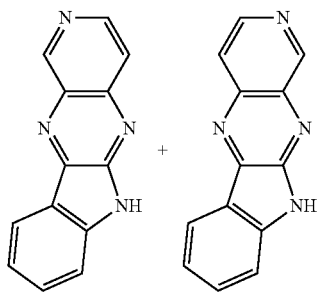 [SMILES: c1ccc2c(c1)[nH]c1nc3ccncc3nc12 ; c1ccc2c(c1)[nH]c1nc3cnccc3nc12]
5

TABLE 1-continued
Examples of the polycyclic organic compound for Cor in the insulating layers
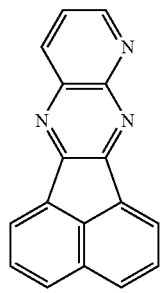 [SMILES: c1cc2c3c(cccc3c1)-c1nc3ncccc3nc1-2]
6
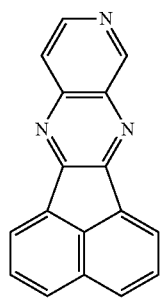 [SMILES: c1cc2c3c(cccc3c1)-c1nc3cnccc3nc1-2]
7
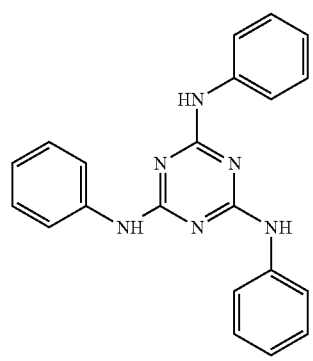 [SMILES: c1ccc(Nc2nc(Nc3ccccc3)nc(Nc3ccccc3)n2)cc1]
8
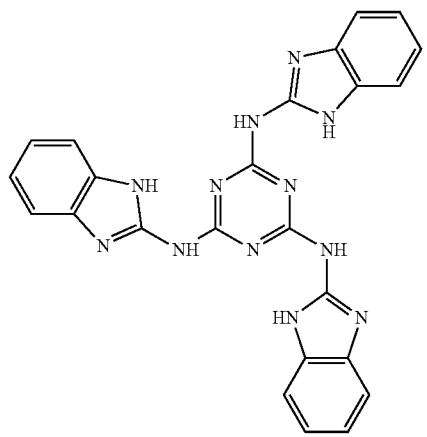 [SMILES: c1ccc2[nH]c(Nc3nc(Nc4nc5ccccc5[nH]4)nc(Nc4nc5ccccc5[nH]4)n3)nc2c1]
9
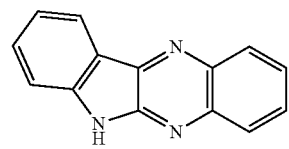 [SMILES: c1ccc2nc3c(nc2c1)[nH]c1ccccc13]
10

TABLE 1-continued
Examples of the polycyclic organic compound for Cor in the insulating layers
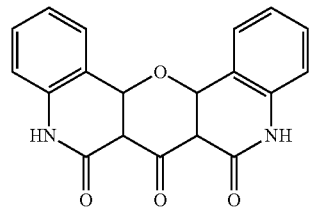 [SMILES: O=C1Nc2ccccc2C2OC3c4ccccc4NC(=O)C3C(=O)C12]
11
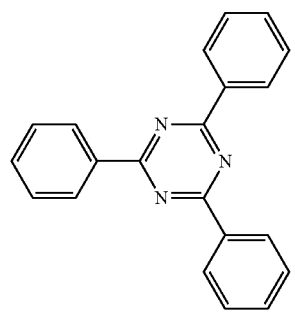 [SMILES: c1ccc(-c2nc(-c3ccccc3)nc(-c3ccccc3)n2)cc1]
12
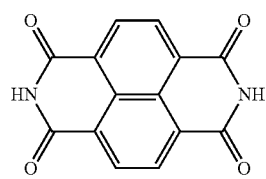 [SMILES: O=C1NC(=O)c2ccc3c4c(ccc1c24)C(=O)NC3=O]
13
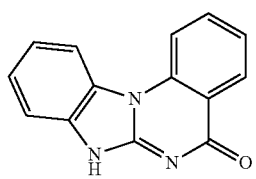 [SMILES: O=c1nc2[nH]c3ccccc3n2c2ccccc12]
14
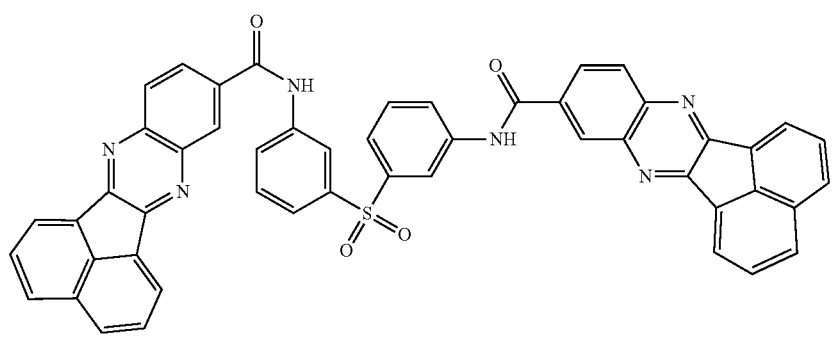 [SMILES: O=C(Nc1cccc(S(=O)(=O)c2cccc(NC(=O)c3ccc4nc5c(nc4c3)-c3cccc4cccc-5c34)c2)c1)c1ccc2nc3c(nc2c1)-c1cccc2cccc-3c12]
15
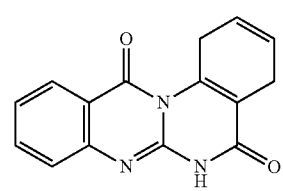 [SMILES: O=c1[nH]c2nc3ccccc3c(=O)n2c2c1CC=CC2]
16

TABLE 1-continued
Examples of the polycyclic organic compound for Cor in the insulating layers
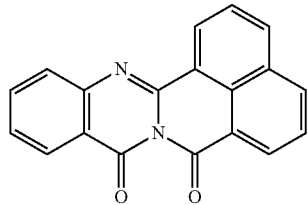 [SMILES: O=c1c2ccccc2nc2c3cccc4cccc(c(=O)n12)c43]  17
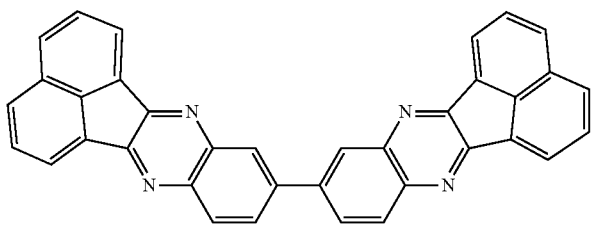 [SMILES: c1cc2c3c(cccc3c1)-c1nc3cc(-c4ccc5nc6c(nc5c4)-c4cccc5cccc-6c45)ccc3nc1-2]  18
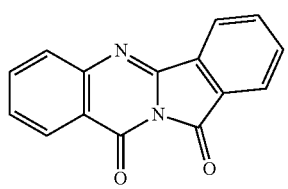 [SMILES: O=C1c2ccccc2-c2nc3ccccc3c(=O)n21]  19
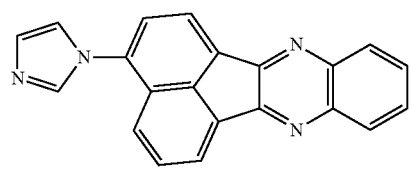 [SMILES: c1ccc2nc3c(nc2c1)-c1cccc2c(-n4ccnc4)ccc-3c12]  20
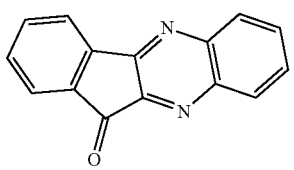 [SMILES: O=C1c2ccccc2-c2nc3ccccc3nc21]  21
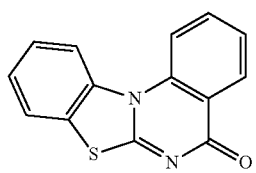 [SMILES: O=c1nc2sc3ccccc3n2c2ccccc12]  22
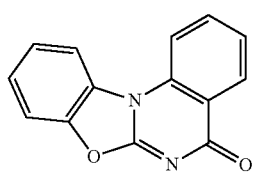  23
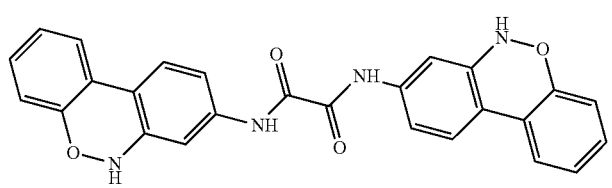 [SMILES: O=C(Nc1ccc2c(c1)NOc1ccccc1-2)C(=O)Nc1ccc2c(c1)NOc1ccccc1-2]  24

TABLE 1-continued
Examples of the polycyclic organic compound for Cor in the insulating layers
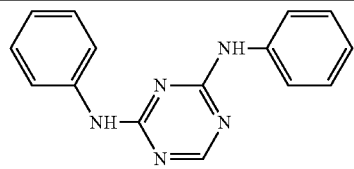
25
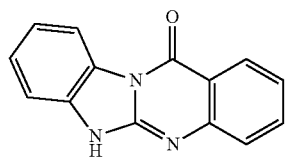 [SMILES: O=c1c2ccccc2nc2[nH]c3ccccc3n12]
26
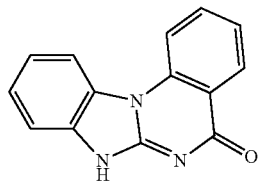 [SMILES: O=c1nc2[nH]c3ccccc3n2c2ccccc12]
27
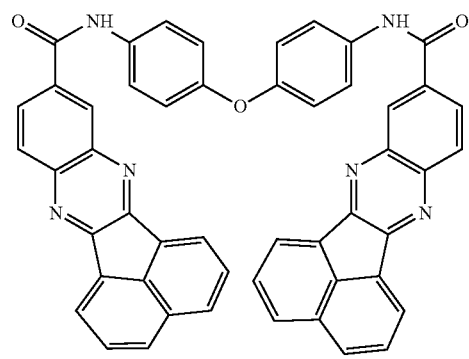 [SMILES: O=C(Nc1ccc(Oc2ccc(NC(=O)c3ccc4nc5c(nc4c3)-c3cccc4cccc-5c34)cc2)cc1)c1ccc2nc3c(nc2c1)-c1cccc2cccc-3c12]
28
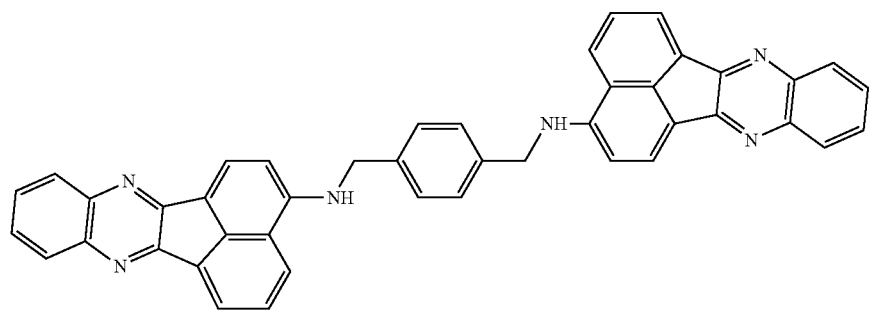 [SMILES: c1ccc2nc3c(nc2c1)-c1cccc2c(NCc4ccc(CNc5ccc6c7c(cccc57)-c5nc7ccccc7nc5-6)cc4)ccc-3c12]
29
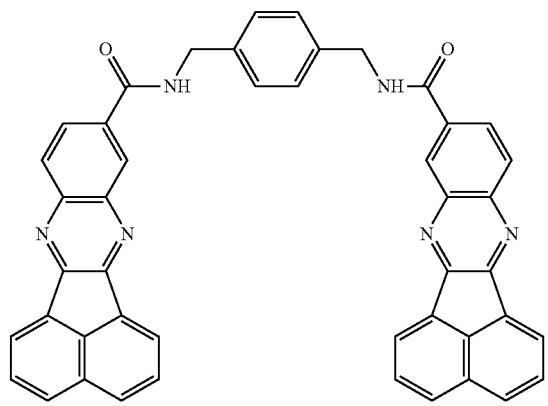 [SMILES: O=C(NCc1ccc(CNC(=O)c2ccc3nc4c(nc3c2)-c2cccc3cccc-4c23)cc1)c1ccc2nc3c(nc2c1)-c1cccc2cccc-3c12]
30

TABLE 1-continued
Examples of the polycyclic organic compound for Cor in the insulating layers
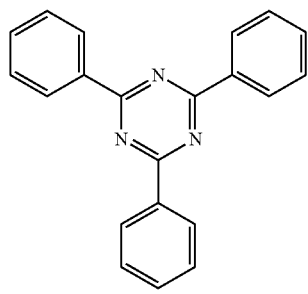 [SMILES: c1ccc(-c2nc(-c3ccccc3)nc(-c3ccccc3)n2)cc1]
31
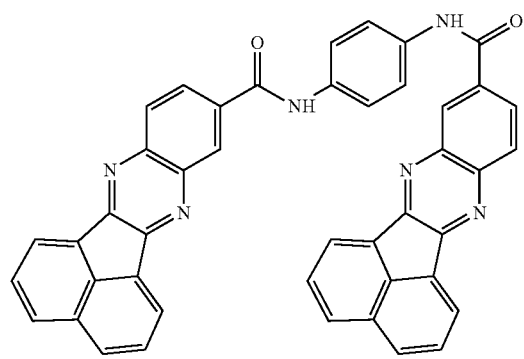 [SMILES: O=C(Nc1ccc(NC(=O)c2ccc3nc4c(nc3c2)-c2cccc3cccc-4c23)cc1)c1ccc2nc3c(nc2c1)-c1cccc2cccc-3c12]
32
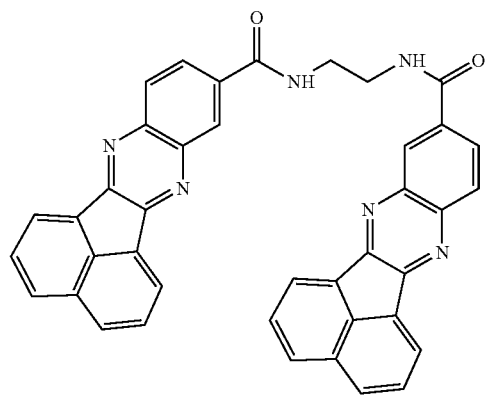 [SMILES: O=C(NCCNC(=O)c1ccc2nc3c(nc2c1)-c1cccc2cccc-3c12)c1ccc2nc3c(nc2c1)-c1cccc2cccc-3c12]
33
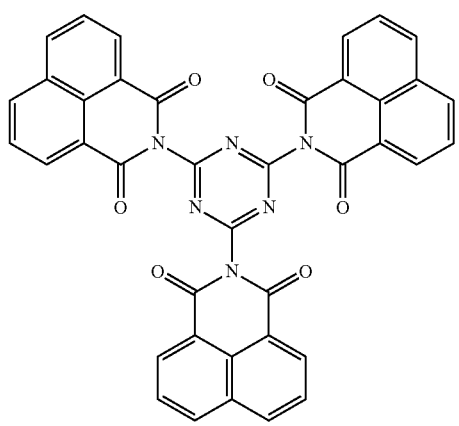 [SMILES: O=C1c2cccc3cccc(c23)C(=O)N1c1nc(N2C(=O)c3cccc4cccc(c34)C2=O)nc(N2C(=O)c3cccc4cccc(c34)C2=O)n1]
34

TABLE 1-continued
Examples of the polycyclic organic compound for Cor in the insulating layers
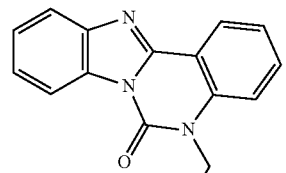 35
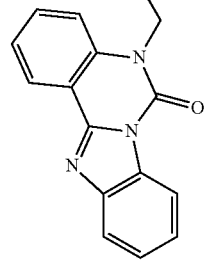 36
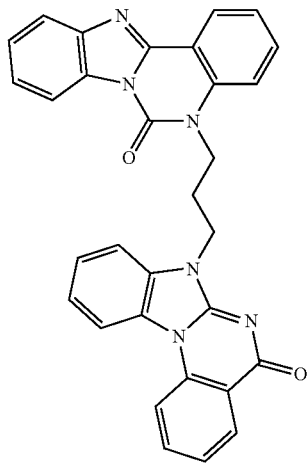 [SMILES: O=c1nc2n(CCCn3c(=O)n4c5ccccc5nc4c4ccccc43)c3ccccc3n2c2ccccc12] 37
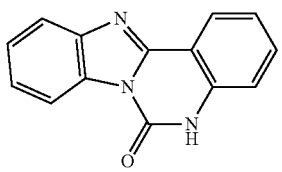 38
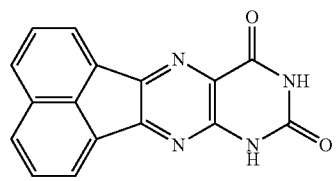 [SMILES: O=c1[nH]c(=O)c2nc3c(nc2[nH]1)-c1cccc2cccc-3c12] 39
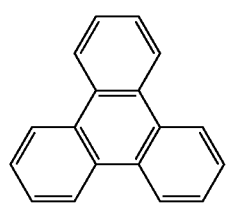 [SMILES: c1ccc2c(c1)c1ccccc1c1ccccc21]

TABLE 1-continued

Examples of the polycyclic organic compound for Cor in the insulating layers

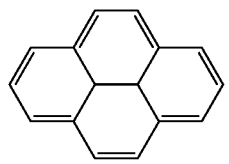 [SMILES: C1=CC2=CC=C3C=CC=C4C=CC(=C1)C2C43]

40

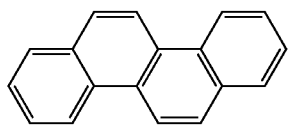

41

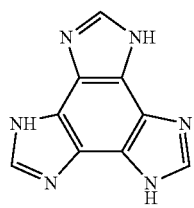 [SMILES: c1nc2c([nH]1)c1nc[nH]c1c1nc[nH]c21]

41

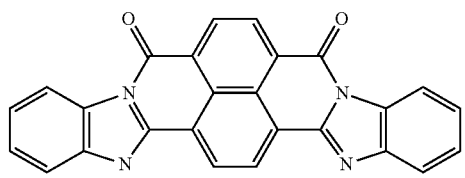

42

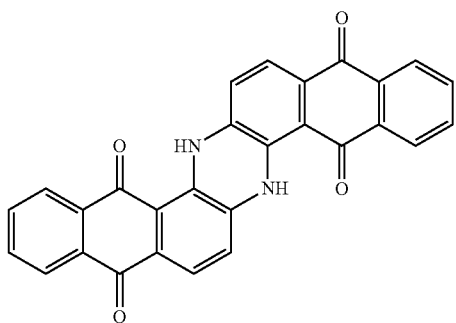 [SMILES: O=c1c2ccccc2c(=O)c2c1ccc1[nH]c3c(ccc4c(=O)c5ccccc5c(=O)c43)[nH]c12]

43

The "+" in formula 5 indicates both the isomers are options, alternatively the two isomers can be present in a mixture In another embodiment of the present invention, the modifying functional groups M are each independently selected from the group consisting alkyl, aryl, substituted alkyl, alkoxyl, substituted aryl, electrophilic groups, nucleophilic groups, and any combination thereof. The modifying functional groups provide solubility of organic compounds at the stage of manufacturing and additional insulating properties to the solid insulating layer of the metacapacitor. The electrophilic and nucleophilic groups increase the electro-polarizability of the organic compounds. In yet another embodiment of the present invention, the insulating layers comprise polymeric materials selected from the list comprising fluorinated alkyls, polyethylene, paraphenylene terephthalamide (kevlar), poly(vinylidene fluoride-hexafluoropropylene), polypropylene, fluorinated polypropylene, polydimethylsiloxane. In still another embodiment of the present invention, at least one of the insulating layers comprises a polymeric material formed on the basis of water-soluble polymers which are selected from the structures 44 to 49 as given in Table 2.

TABLE 2

Examples of the water-soluble polymers for the insulating layers

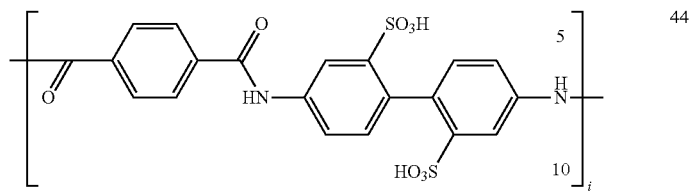

poly(2,2'-disulfo-4,4'-benzidine terephthalamide)

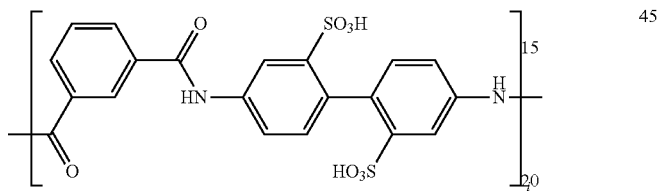

poly(2,2'-disulfo-4,4'-benzidine isophthalamide)

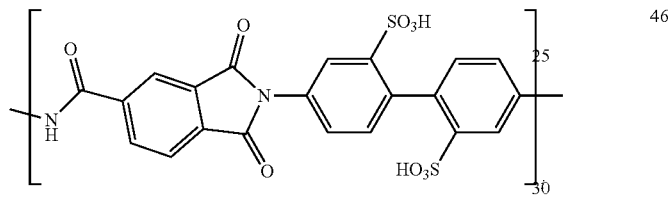

poly(2,2'-disulfo-4,4'-benzidine 1,3-dioxo-isoindoline-5-carboxamide)

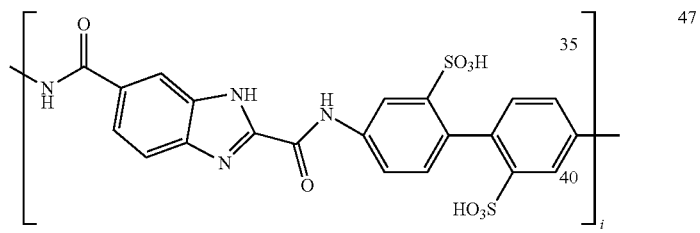

poly(2,2'-disulfo-4,4'-benzidine 1H-benzimidazole-2,5-dicarboxamide)

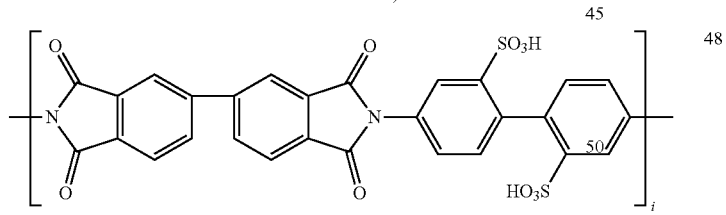

poly(2,2'-disulfo-4,4'-benzidine 3,3',4,4'-biphenyl tetracarboxylic acid diimide)

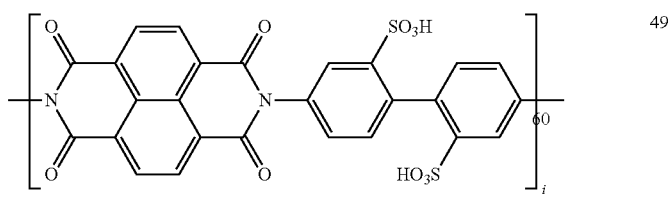

poly(2,2'disulpho-4,4'benzidine 1,4,5,8-naphtalen tetracarboxylic acid diimide)

In another embodiment of the present invention, the insulating layers comprise a polymeric material formed on the basis of polymers soluble in organic solvents which are selected from the structures 50 to 55 as given in Table 3.

In some embodiments, the polarization layer possesses dielectric permittivity $\varepsilon_{pol}$ which may be in the broad range at least about 100, 200, 300, 400, 500, 1000, 2000, 3000, 4000, 5000, 6000, 7000, 8000, 9000, 10,000, or 100,000. In

TABLE 3

Examples of the polymers soluble in organic solvents for the insulating layers

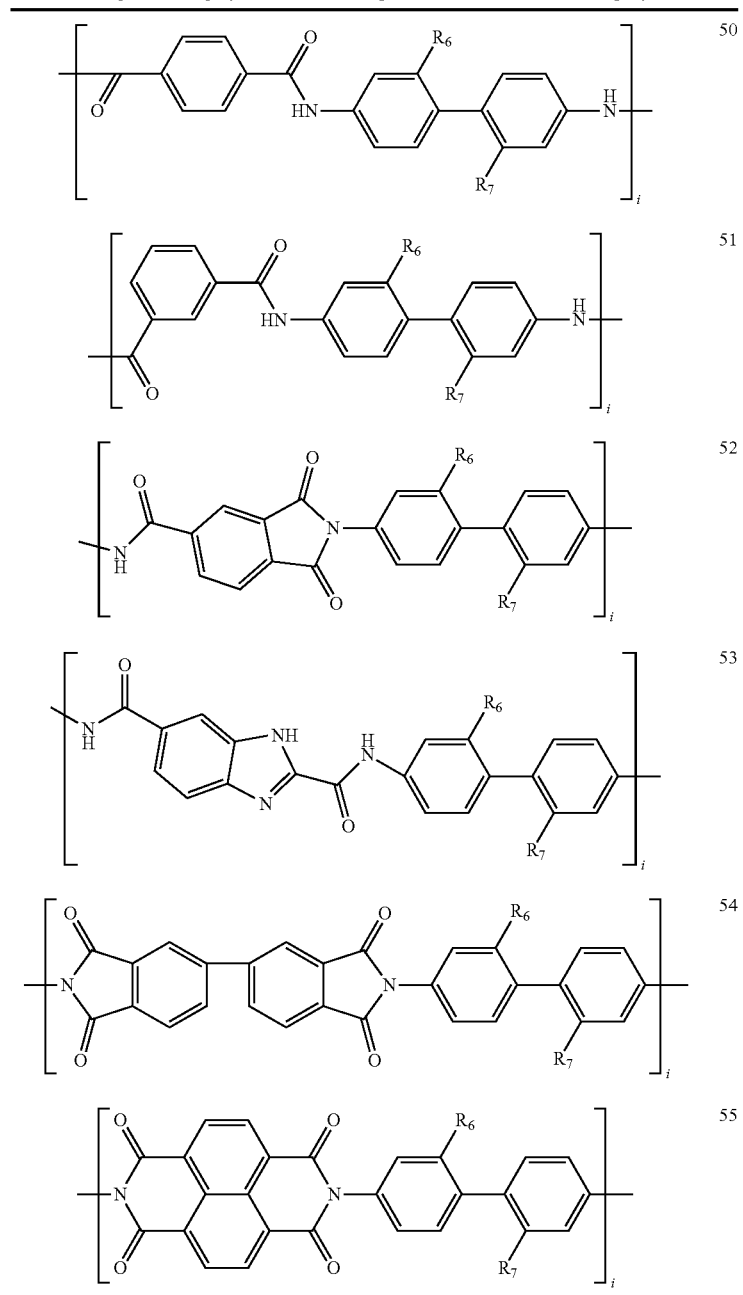

wherein the modifying functional groups $R_6$ and $R_7$ are independently selected from the list comprising alkyl, aryl, substituted alkyl, substituted aryl, and any combination thereof.

In one embodiment of the present invention at least one of the polarization layers may be fabricated from a material selected from crystalline material, poly-crystal material, semi-crystalline, aligned supramolecular structures, and amorphous material.

one embodiment of the present invention, the polarization layers comprise nano-particles of electro-conductive oligomers. In another embodiment of the present invention, the longitudinal axes of the electroconductive oligomers are directed predominantly perpendicularly in relation to the solid multilayer structure surface. In one embodiment of the present invention, the electroconductive oligomers are selected from the list comprising following structural formulas corresponding to one of structures 57 to 65 as given in Table 4.

TABLE 4

Examples of the electroconductive oligomers for the polarization layers

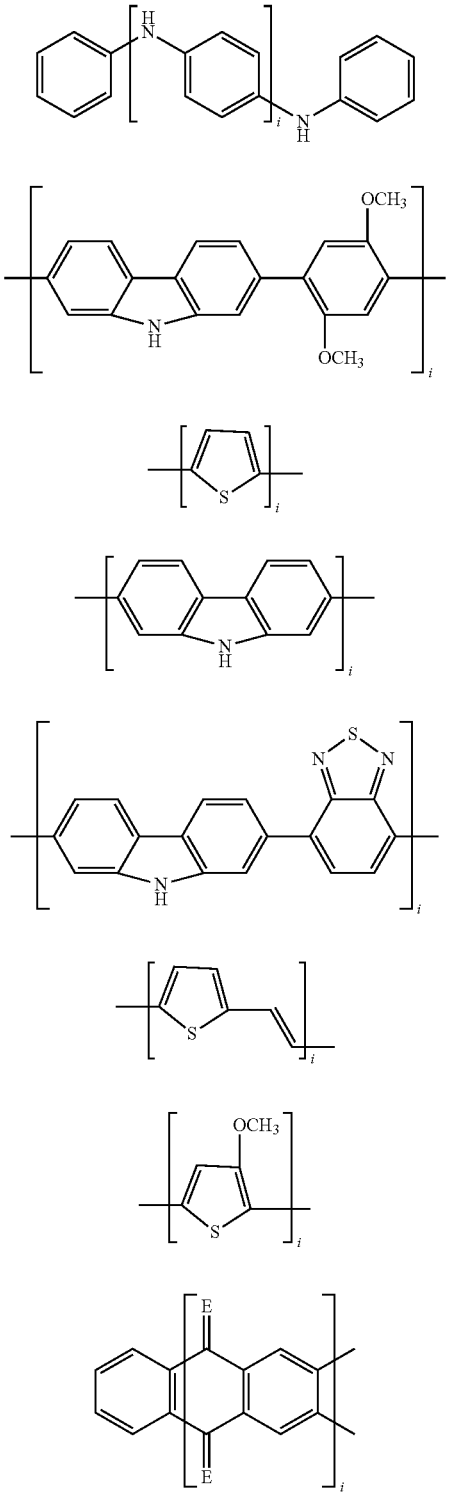

TABLE 4-continued

Examples of the electroconductive oligomers for the polarization layers

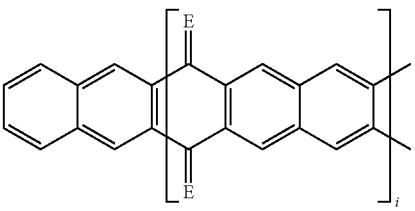

where i is between 1 and 500, and E is a heteroatom group or $SO_3R$, where R is selected from H, an alkyl group, or an alkene group.

In some instances, the polarization layer is comprised of side-chain and/or pendant polymers or composite oligomers such as the aforementioned YanLi polymers.

In such instances, non-linear polarization is achieved on the side-chain and/or a of polycyclic aromatic pendant. Rylene based chromophores (defined as rylene fragments herein) and other chromophores are a possible implementation of the polarizable unit. These polarizable units could be incorporated as sidechains to the oligomer via a wide variety of linkers or used as crosslinking agents to join polymers into a polymer network. Use of rylene fragments in capacitors is described in greater detail in U.S. patent application Ser. No. 14/919,337, which is incorporated herein in its entirety by reference.

The rylene fragments can be made non-linear polarizable by adding a variety of functional groups to various positions of the structure. Incorporating electron donors and electron acceptors is one way to enhance the polarizability. Electrophilic groups (electron acceptors) are selected from —$NO_2$, —$NH_3^+$ and —$NR_3^+$ (quaternary nitrogen salts), counterion $Cl^-$ or $Br^-$, —CHO (aldehyde), —CRO (keto group), —$SO_3H$ (sulfonic acids), —$SO_3R$ (sulfonates), $SO_2NH_2$ (sulfonamides), —COOH (carboxylic acid), —COOR (esters, from carboxylic acid side), —COCl (carboxylic acid chlorides), —$CONH_2$ (amides, from carboxylic acid side), —$CF_3$, CN, wherein R is radical independently selected in each occurrence from the list comprising alkyl (e.g. methyl, ethyl, isopropyl, tert-butyl, neopentyl, cyclohexyl etc.), allyl (—$CH_2$—CH=$CH_2$), benzyl (—$CH_2C_6H_5$) groups, phenyl (+substituted phenyl) and other aryl (aromatic) groups. Nucleophilic groups (electron donors) are selected from —$O^-$ (phenoxides, like —ONa or —OK), —$NH_2$, —NHR, —$NR_2$, —NRR', —OH, OR (ethers), —NHCOR (amides, from amine side), —OCOR (esters, from alcohol side), alkyls, —$C_6H_5$, vinyls, wherein R and R' are radicals independently selected from the list comprising alkyl (e.g. methyl, ethyl, isopropyl, tert-butyl, neopentyl, cyclohexyl etc.), allyl (—CH2-CH=CH2), benzyl (—CH2C6H5) groups, phenyl (+substituted phenyl) and other aryl (aromatic) groups. Preferred electron donors include, but are not limited to, amino and phosphino groups and combinations thereof. Preferred electron acceptors include, but are not limited to, nitro, carbonyl, oxo, thioxo, sulfonyl, malononitrile, isoxazolone, cyano, dicyano, tricyano, tetracyano, nitrile, dicarbonitrile, tricarbonitrile, thioxodihydropyrimidinedione groups. More conjugated bridges include, but are not limited to, 1,2-diphenylethene, 1,2-diphenyldiazene, styrene, hexa-1,3,5-trienylbenzene and 1,4-di(thiophen-2-yl)buta-1,3-diene, alkenes, dienes, trienes, polyenes, diazenes and combinations thereof.

Existence of the electrophilic groups (acceptors) and the nucleophilic groups (donors) on an aromatic polycyclic conjugated molecule (polarizable unit) promotes electronic polarizability of these molecules. Under the influence of external electric field electrons are displaced across aromatic polycyclic conjugated molecule to compensate the electric field. The nucleophilic groups (donors) and the electrophilic groups (acceptors) add to the electron density of the polarizable unit, which increases polarizability of such molecules and ability to form compensating electric field counter in the presence of an electric field. Thus, a distribution of electronic density in the molecules is non-uniform. The presence of the polarizable units (also known herein as electroconductive oligomers) leads to highly polarizable material comprising the polarization layer. Ionic groups may increase polarization of aforementioned chromophores. A non-centrosymmetric arrangement of the dopant group(s) can lead to a strong nonlinear response of the compound's electronic polarization in the presence of an electric field. Additionally, an anisometric molecule or polarizing unit can lead to a strong nonlinear response of the compound's electronic polarization in the presence of an electric field.

Carbon chains (e.g. alkyl, alkoxyl, aryl) covalently attached to the aforementioned chromophores can form a resistive envelope which suitable for isolation layers. Such layers can achieve resistivity greater than $10^{15}$ Ohm cm. In some instances, the resistive substituents provide solubility of the polarizable unit in a solvent and act to electrically insulate supramolecular structures comprised of said chromophores from neighboring supramolecular structures. Resistive substituents (e.g. resistive tails described above) increase the electric strength of these electro-polarizable compounds and breakdown voltage of the dielectric layers made on their basis.

In some embodiments, the polarization layer and insolation layers are covalently attached, such as in the instance wherein a polymer comprised of chromophore side chains or pendants and resistive carbon chains. In such embodiments, supramolecular structures, formed from assembly of chromophores via pi-pi stacking and Van der Waals interactions of the resistive carbon chains, create layers of polarization layers and insolation layers.

Examples of Rylene Fragments

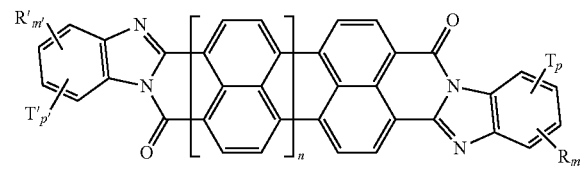

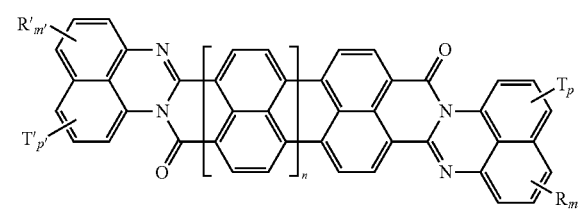

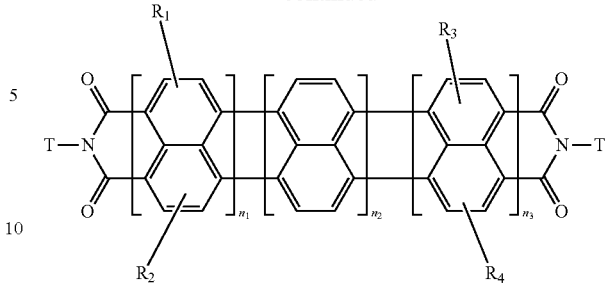

In the examples shown above, it is readily apparent that one or both ends of the rylene fragment may be attached to a polymer chain via T, $T_p$, or $T'_{p'}$ and may be functionalized for better polarizability at $R_m$, $R'_m$, $R_1$, $R_2$, $R_3$, or $R_4$. The preferred but non-limiting range for n, $n_1$, $n_2$, and $n_3$ are between 0 and 8, with the proviso that the rylene fragment needs at least one naphthalene unit in order to be considered a rylene fragment and n, $n_1$, $n_2$, and $n_3$ are independently selected from said range of integers.

Rylene fragments may also be fused with anthracene structures at the nitrogen containing ends. Some non-limiting examples are shown below. These species will similarly benefit in polarizability by the addition of dopant groups, as illustrated in the examples below.

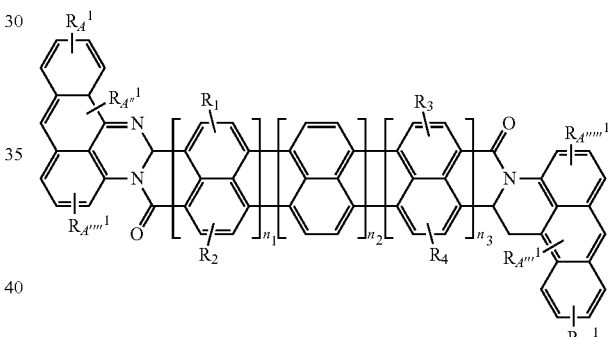

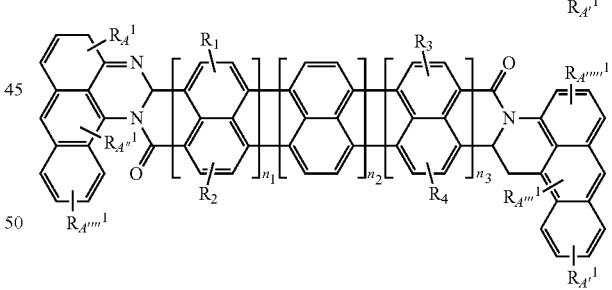

-continued

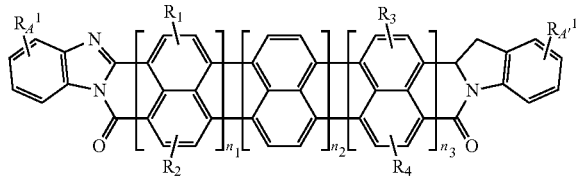

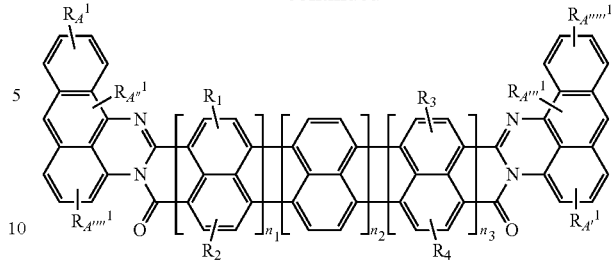

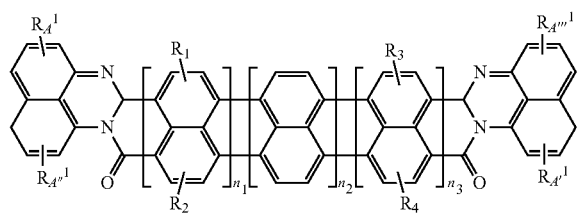

In the above examples $R_1$, $R_2$, $R_3$, and $R_4$ substituents are independently absent, a resistive tail, or a dopant group in each occurrence, $R_A^1$, $R_{A'}^1$, $R_{A''}^1$, $R_{A'''}^1$, $R_{A''''}^1$, and $R_{A'''''}^1$ are each independently absent, a resistive tail, or a dopant group, and each occurrence of $n_1$, $n_2$, and $n_3$ can be any integer independently selected from 0 to 8 with the provision that not all $n_1$, $n_2$, and $n_3$ values can equal 0.

Figure 8:
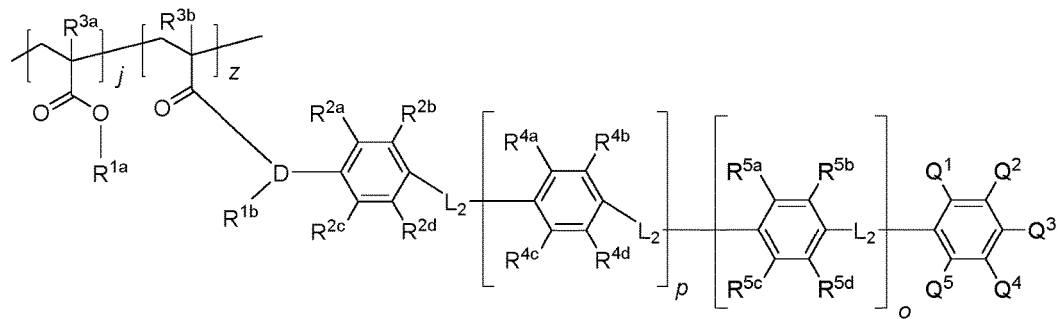
FIG. 8 shows an example of a YanLi co-polymer according to an alternative aspect of the present disclosure.
Figure 9:
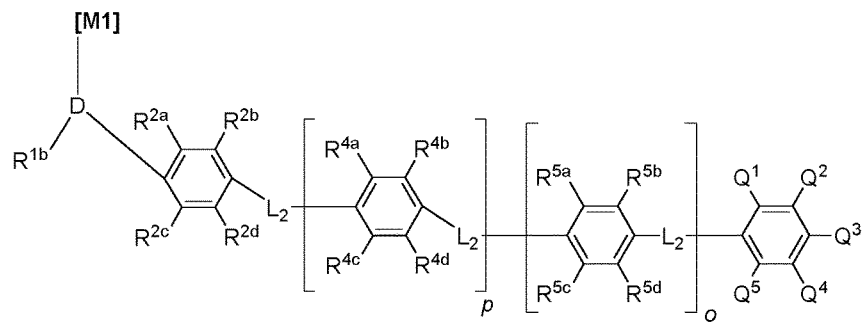
FIG. 9 shows an example of a side-chain of a YanLi polymer according to an alternative aspect of the present disclosure.
Figure 10:
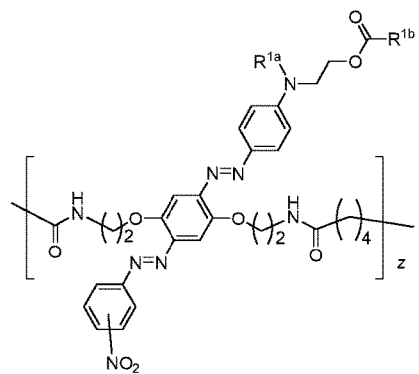
FIG. 10 shows an example of a YanLi polymer according to an alternative aspect of the present disclosure.
Figure 11:
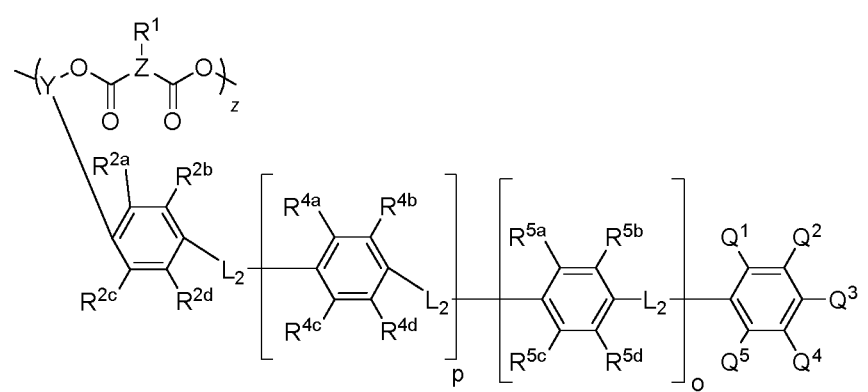
FIG. 11 shows an example of a YanLi polymer according to an alternative aspect of the present disclosure.

Applicable YanLi embodiments include composite polymeric materials of the general formulae depicted in FIGS. 8, 9, 10, and 11. For illustration only the formula from FIG. 8 is shown below with variables for all formulae defined.

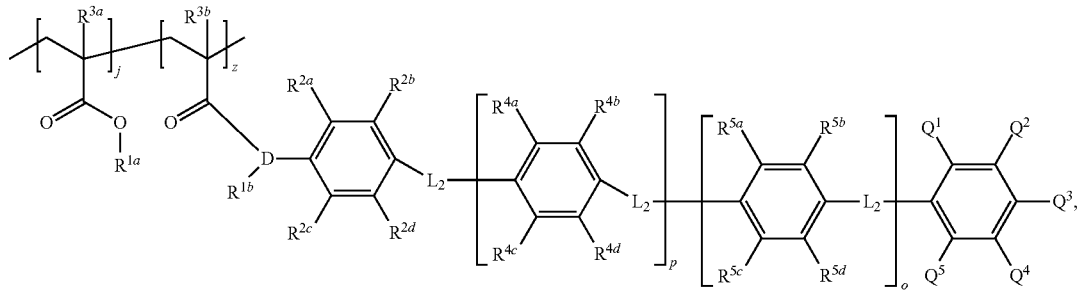

-continued

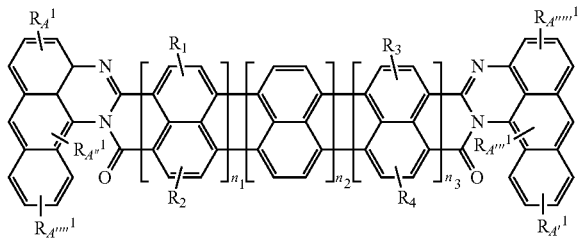

wherein M1 is selected from

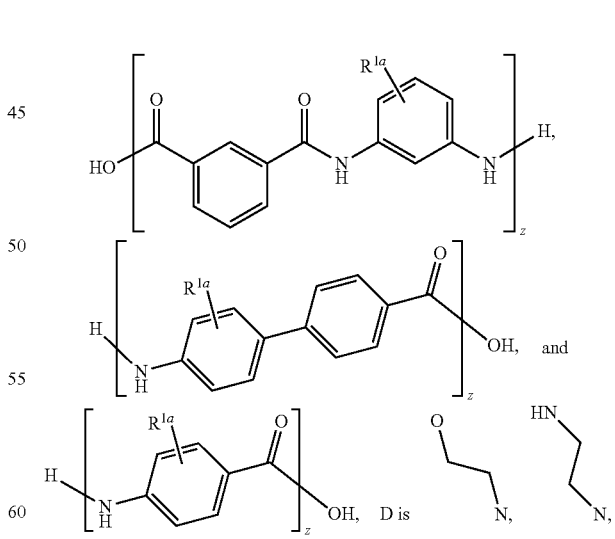

N, or a hydrocarbon chain, wherein $R^{1a}$, $R^{1b}$, $R^{2a}$, $R^{2b}$, $R^{2c}$, $R^{2d}$, $R^{3a}$, $R^{3b}$, $R^{4a}$, $R^{4b}$, $R^{4c}$, $R^{4d}$, $R^{5a}$, $R^{5b}$, $R^{5c}$, $R^{5d}$ are independently selected from —H, —OH, -Ak, -Ak-$X_1$, -OAk, or -OAk-$X_1$; $L_2$ is a heteroatom bridge in conjugation with the ring system containing $R^{2a}$, $R^{2b}$, $R^{2c}$, $R^{2d}$, $Q^1$, $Q^2$, $Q^3$,

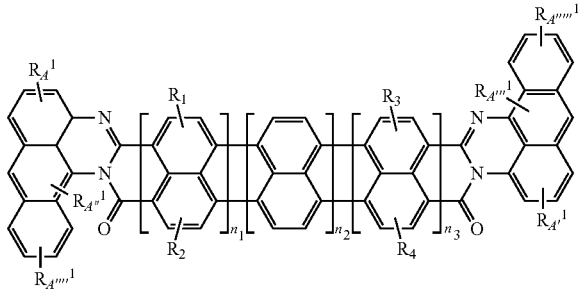

$Q^4$, $Q^5$; wherein $R^{2a}$, $R^{2b}$, $R^{2c}$, $R^{2d}$, $Q^1$, $Q^2$, $Q^3$, $Q^4$, $Q^5$ are each independently selected from —H and any electron withdrawing or electron donating group; wherein Ak is alkyl, X is any halogen, j is 0-150, z is 1-300, l is 1-51, o is 0-10, p is 0-1 when o is less than or equal to one and 1 when o is greater than 1, wherein $R^{1a}$ or $R^{1b}$ is an insulating resistive tail or both $R^{1a}$ and $R^{2a}$ are insulating resistive tails.

In some implementations of composite polymeric materials of the above general formula, the value of j may be equal to or greater than 1.

In some implementations of composite polymeric materials of the above general formula, the value of j may be equal to zero. In such implementations, $R^{1a}$, $R^{1b}$, $R^{3a}$ or $R^{3b}$ may possesses at least 7 carbon atoms.

In some implementations of composite polymeric materials of the above general formula, $R^{1a}$, $R^{1b}$, $R^{3a}$, and $R^{3b}$ may be insulating resistive tails are independently selected from the group consisting of saturated hydrocarbon, saturated halogenated hydrocarbon, partially halogenated hydrocarbon, aryl chain, and cycloalkyl, and X—RR'R"; wherein X is selected from C, O, N, and S, and R, R', and R" are independently selected from H and $C_{5-50}$, wherein one or more of R, R', and R" is $C_{5-50}$. As used in the present disclosure, the notation $C_{5-50}$ means a chain of 5 to 50 carbon atoms. In such implementations a chain may be monounsaturated or partially unsaturated, yet the unsaturated bonds are not conjugated. In such implementations all insulating resistive tails may be selected independently from the group consisting of non-aromatic carbocycles and non-aromatic heterocycles.

In some implementations of composite polymeric materials of the above general formula, all insulating resistive tails may be rigid.

In some implementations of composite polymeric materials of the above general formula, $Q_1$, $Q_2$, $Q_3$, $Q_4$ and $Q_5$ may each be independently selected from —$NO_2$, —$NH_3^+$ and —NRR'R"+ (quaternary nitrogen salts) with counterion $Cl^-$ or $Br^-$, —CHO (aldehyde), —CRO (keto group), —$SO_3H$ (sulfonic acids), —$SO_3R$ (sulfonates), $SO_2NH_2$ (sulfonamides), —COOH (carboxylic acid), —COOR (esters, from carboxylic acid side), —COCl (carboxylic acid chlorides), —$CONH_2$ (amides, from carboxylic acid side), —$CF_3$, —$CCl_3$, —CN, —$O^-$ (phenoxides) with counter ion $Na^+$ or $K^+$, —$NH_2$, —NHR, —$NR_2$, —OH, OR (ethers), —NHCOR (amides, from amine side), —OCOR (esters, from alcohol side), alkyls, —$C_6H_5$, vinyls, wherein R and R' and R" are radicals selected from the list comprising hydrogen, alkyl (methyl, ethyl, isopropyl, tert-butyl, neopentyl, cyclohexyl etc.), allyl (—CH2-CH=CH2), benzyl (—CH2C6H5) groups, phenyl (+substituted phenyl) and other aryl (aromatic) groups. In some such implementations, one or more of $Q^1$, $Q^2$, $Q^3$, $Q^4$, and $Q^5$ may be —$NO_2$.

In some implementations of composite polymeric materials of the above general formula, D may be a hydrocarbon chain that is interrupted by heteroatoms at the point of backbone attachment and side chain attachment.

In some implementations of composite polymeric materials of the above general formula, $L_2$ may be an azo-bridge or —N=N—, an alkene bridge or —HC=CH—, and alkyne bridge or —C≡C—.

In another embodiment of the solid multilayer structure of the present invention, the polarization layers comprise the electro-conductive particles of electro-conductive oligomers. In another embodiment of the present invention, the electro-conductive oligomers comprising moieties selected from the aforementioned rylene fragments, chromophores, and structures 57 to 63 as given in Table 4. In another embodiment of the disclosed solid multilayer structure, the electro-conductive oligomers further comprise substitute groups R and are described by the following general structural formula II:

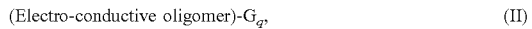

(Electro-conductive oligomer)-$G_q$, (II)

where q is a number of the substitute groups R, q may be equal to 0, 1, 2, 3, 4, 5, 6, 7, 8, 9 or 10. In yet another embodiment of the solid multilayer structure, the substitute groups G are independently selected from the list comprising alkyl, aryl, substituted alkyl, substituted aryl, electrophilic groups, nucleophilic groups, and any combination thereof. In still another embodiment of the solid multilayer structure, a material of the insulator matrix is selected from the list comprising poly (acrylic acid) (PAA), poly(N-vinylpyrrolidone) (PVP), poly(vinylidene fluoride-hexafluoropropylene) [P(VDF-HFP)], ethylene propylene polymers, which include ethylene propylene rubber (EPR) and ethylene propylene diene monomer (EPDM), and silicone rubber (PDMSO) such as dimethyl dichloro siloxane, dimethyl silane diol, and polydimethylsiloxane. These compounds serve also as a stabilizer, protecting the electro-conductive nano-particles from macroscopic aggregation. In one embodiment of the present invention, the thickness of the insulating layer ($d_{ins}$) and thickness of the polarization layer ($d_{pol}$) and breakdown field strength of the insulating layers $E_{ins}$ and breakdown field strength of the polarization layers $E_{pol}$ satisfy the following relations: $d_{ins} < d_{pol}$, and $E_{ins} > E_{pol}$.

In another embodiment of the present invention, the parameter m is greater than or equal to 1, a dielectric material of the insulating layers is polyethylene, a material of the polarization layer is a micro-dispersion PANI-DBSA/PAA, which synthesized using in situ polymerization of aniline in an aqueous dispersion of poly-acrylic acid (PAA) in the presence of dodecylbenzene sulfonate (DBSA), the ratio of PANI to PAA in the composite is greater than or equal to about 20 wt %, thickness of the insulating layer $d_{ins}$ is from 2.5 nm to 1000 nm, and thickness of the polarization layer $d_{pol}$ is from 10 micrometer (μm) to 1.0 mm. In still another embodiment of the present invention, the parameter m is greater than or equal to 1, a dielectric material of the insulating layers is polyethylene, a material of the polarization layer is colloidal PANI dispersions stabilized with poly(N-vinylpyrrolidone) (PVP), a thickness of the insulating layer $d_{ins}$ is from 2.5 nm to 1000 nm, and thickness of the polarization layer $d_{cond}$ is from 10 micrometer (μm) to 50 μm. In another embodiment of the present invention, the polarization layers comprise surfactants which are selected from the list comprising dodecylbenzene sulfonate (DBSA), polyoxyethylene glycol alkyl ethers, polyoxypropylene glycol alkyl ethers, polyoxyethylene glycol octylphenol ethers, polyoxyethylene glycol sorbitan alkyl esters, sorbitan alkyl esters, dodecyldimethylamine oxide.

In some embodiments of the solid multilayer structure of the present disclosure, at least one insulating layer and one polarization layer are covalently bonded. Wherein the insulating layers are comprised of carbon chain moieties longer than four carbons, and the polarization layers are comprised of electrically polarizable moieties.

In some embodiments of the solid multilayer structure of the present disclosure, at least one insulating layer is comprised of two intercalated sets of carbon chain moieties longer than 4 carbons, and wherein one set of carbon chain moieties is covalently bonded to a first polarization layer and another set of carbon chain moieties is covalently bonded to a second polarization layer. Wherein the polarization layers are covalently bonded to sequential insulating layers, and the polarization layers are comprised of electrically polarizable moieties. Wherein the electrically polarizable moieties are preferentially non-linear polarizable compounds.

In some embodiments, the insulating layers comprised of modified organic compounds described hereinabove further consists of plasticizers (e.g. phthalates and non-phthalates) that are non-ionic, or plastic fillers.

In some embodiments, each insulating layer comprised of modified organic compounds described hereinabove are independently selected layer to layer.

In one embodiment of the present invention, the solid multilayer structure further comprises additional protective layers located upon and/or under the solid multilayer structure, wherein the additional protective layers protect the plurality of insulating and polarization layers from damage, may aid in the co-extrusion processing and/or to enhance mechanical properties at post-processing. The thickness of the additional protective (skin) layers is usually at least two times, preferably at least four times, and more preferably at least ten times, the thickness of the individual polarization and insulating layers. The thickness of the additional protective layers may be varied to make the solid multilayer structure having a specific thickness. In another embodiment of the present invention, the additional protective layers comprise of polymers such as polyesters including carboxylate and glycol monomer molecules, wherein the carboxylate monomer molecules comprise 2,6-naphthalene dicarboxylic acid and isomers thereof, terephthalic acid; isophthalic acid; phthalic acid; azelaic acid; adipic acid; sebacic acid; norbornene dicarboxylic acid; bi-cyclo-octane dicarboxylic acid; 1,4-cyclohexane dicarboxylic acid and isomers thereof, t-butyl isophthalic acid, trimellitic acid, sodium sulfonated isophthalic acid; 4,4'-biphenyl dicarboxylic acid and isomers thereof, and lower alkyl esters of these acids, such as methyl or ethyl esters where the term "lower alkyl" refers to C1-C10 straight-chained or branched alkyl groups, and wherein the glycol monomer molecules comprise ethylene glycol; propylene glycol; 1,4-butanediol and isomers thereof, 1,6-hexanediol; neopentyl glycol; polyethylene glycol; diethylene glycol; tricyclodecanediol; 1,4-cyclohexanedimethanol and isomers thereof; norbornanediol; bicyclo-octanediol; trimethylol propane; pentaerythritol; 1,4-benzenedimethanol and isomers thereof, bisphenol A; 1,8-dihydroxy biphenyl and isomers thereof, and 1,3-bis (2-hydroxyethoxy)benzene.

In still another embodiment of the present invention, the solid multilayer structure further comprises binding (tie) layers which may be present between the additional protective layers and the insulating layers and/or between the insulating layers and polarization layers. The binding (tie) layer may assist in the adherence (adhesion) of the layers and provide long term stability while the solid multilayer structure of the present invention is exposed to the external environment. The tie-layers may optionally contain UV absorbers. The tie layers may optionally contain conventional plasticizers, tackifiers, or combinations thereof. The tie layer may be applied utilizing conventional film forming techniques. In yet another embodiment of the present invention, the binding (tie) layers comprise polydimethyl siloxane oxamide based segmented copolymer (SPDX), and copolyethylene terephthalates (CoPETs) including modifications with functional groups such as sulfonic acids, poly (methyl methacrylate)/poly(vinylidene fluoride) (PMMA/PVDF) blends, modified olefins with functional co-monomers such as maleic anhydride, acrylic acid, methacrylic acid or vinyl acetate, UV or thermally curable acrylates, silicones, epoxies, siloxanes, and urethane acrylates, conventional plasticizers, tackifiers, or combinations thereof.

In one embodiment of the present invention, the solid multilayer structure further comprises hard layers which are located inside and outside the multilayer structure and provide its impact-resistance and prevent abrasion between the layers of the multilayered structure (reduce the abradability of the structure). In another embodiment of the present invention, the hard layers comprise PMMA/PVDF blends, thermoplastic polyurethanes, curable polyurethanes, CoPET, cyclic olefin copolymers (COC's), fluoropolymers and their copolymers such as poly(vinylidene fluoride) (PVDF), ETFE, FEP, and THV, thermoplastic and curable acrylates, cross-linked acrylates, cross-linked urethane acrylates, cross-linked urethanes, curable or cross-linked polyepoxides, and SPDX.

There are several methods of creating the disclosed solid multilayer structure. In one embodiment of the method, the step b) of formation of the multilayer structure comprises alternating steps of the application of a solution of an insulating material and the application of a solution of the polarization material, wherein both application steps are followed with a step of drying to form a solid insulating and polarization layers, the alternating steps are recurred until a formation of the multilayer structure is completed. In another method, the step b) of formation of the multilayer structure comprises alternating steps of the application of a melt of an insulating material and the application of a melt of the polarization material, wherein both application steps are followed with a step of cooling down to form a solid insulating and polarization layers, the alternating steps are recurred until a formation of the multilayer structure is completed.

A brief description of co-extrusion method for forming the solid multilayer structure is provided hereinafter. An initial step in the manufacture of the solid multilayer structure is the generation of the materials (polycyclic organic compound and/or polymers) to be used in formation of the insulating layers and the polarization layers, as well as addition layers. Typically, these materials are formed by extrusion, although other methods of formation can be used. Extrusion conditions are chosen to adequately feed, melt, mix and pump the material feed streams in a continuous and stable manner. Final melt stream temperatures are chosen to be within a range that reduces freezing, crystallization, or unduly high pressure drops at the low end of the range and that reduces degradation at the high end of the range. The entire melt stream processing of more than one material, up to and including film casting on a chill roll, is often referred to as co-extrusion.

Preferably, the materials of the insulating layers, the polarization layers, and the additional protective layers, the binding (tie) layers; the hard layers are chosen to have similar rheological properties (e.g., melt viscosities) so that they can be co-extruded. Typically, polarization layers and the additional layers have a glass transition temperature, Tg, that is either below or no greater than about 30° C. above the glass transition temperature of the insulating layers. Preferably, the glass transition temperature of the polarization layers and the additional layers is below the glass transition temperature of the insulating layers.

Following extrusion, each melt stream is conveyed to a gear pump used to regulate the continuous and uniform rate of the extruded material flow. A static mixing unit can be used to carry the material melt stream from the gear pump into a multilayer feed-block with uniform melt stream temperature. The entire melt stream is typically heated as uniformly as possible to enhance both uniform flow of the melt stream and reduce degradation during melt processing.

Multilayer feed-blocks divide each of the two or more the extruded material melt streams into many layers, interleave these layers, and combine the many layers into a single multilayer stream. The layers from any given melt stream are created by sequentially bleeding off part of the stream from a main flow channel into side channel tubes which lead to layer slots in the feed block manifold. The layer flow can be controlled by choices made in machinery, as well as the shape and physical dimensions of the individual side channel tubes and layer slots.

The side channel tubes and layer slots of the two or more melt streams are often interleaved to form alternating layers. The feed-block's downstream-side manifold is typically shaped to compress and uniformly spread the layers of the combined multilayer stack transversely. Thick additional layers can be fed near the manifold walls using the melt streams of the multilayer structure, or by a separate melt stream.

The multilayer stack exiting the feed-block manifold enters a final shaping unit such as a die. Alternatively, the stream can be split, preferably normal to the layers in the stack, to form two or more multilayer streams that can be recombined by stacking. The stream can also be split at an angle other than normal to the layers. A flow channeling system that splits and stacks the streams is called a multiplier. The width of the split streams (i.e., the sum of the thicknesses of the individual layers) can be equal or unequal. The multiplier ratio is defined as the ratio of the wider to narrower stream widths. Unequal stream widths (i.e., multiplier ratios greater than unity) can be useful in creating layer thickness gradients. In the case of unequal stream widths, the multiplier may spread the narrower stream and/or compress the wider stream transversely to the thickness and flow directions to ensure matching layer widths upon stacking.

Prior to multiplication, additional layers can be added to the multilayer structure. These layers may perform as PBLs within the multiplier. After multiplication and stacking, some of these layers can form internal boundary layers between the insulating layer and polarization layers.

After multiplication, the web is directed to a final shaping unit. The web is then cast onto a chill roll, sometimes also referred to as a casting wheel or casting drum. This casting is often assisted by electrostatic pinning, the details of which are well-known in the art of organic film manufacture. The web can be cast to a uniform thickness across the web or a deliberate profiling of the web thickness can be induced using die lip controls.

In yet another method, the step b) of formation of the solid multilayer structure comprises a step of co-extrusion of set of the layers successively containing alternating polarization materials and insulating dielectric materials onto the substrate, followed by drying to form the solid multilayer structure. In still another method, the step b) of formation of the solid multilayer structure comprises a step of co-extrusion of set of the layers successively containing alternating melts of polarization materials and insulating dielectric materials, followed with the step of cooling down to form the solid multilayer structure.

Another method of making the solid multilayer structure may be layer-by-layer self-assembly process. This process is commonly used to assemble films or coatings of oppositely charged poly-electrolytes electro-statically, but other bond mechanisms such as hydrogen bond donor/acceptors, metal ions/ligands, and covalent bonding moieties can be the driving force for film assembly. Typically, this deposition process involves exposing the substrate (e.g. solid multilayer structure) having a surface charge, to a series of liquid solutions, or baths. This can be accomplished by immersion of the substrate into liquid baths (also referred to as dip coating), spraying, spin coating, roll coating, inkjet printing, and the like. When the substrate is exposed to the first polyion liquid solution (e.g. in bath), which has charge opposite that of the substrate, then charged species near the substrate surface are adsorbed quickly, establishing a concentration gradient, and drawing (attracting) more polyelectrolyte from the bulk solution to the surface. Further adsorption occurs until a sufficient layer has developed to mask the underlying charge and reverse (change, modify) the net charge of the substrate surface. For mass transfer and adsorption to occur, this exposure time is typically on the order of minutes. The substrate is then removed from the first polyion (e.g. bath) liquid solution, and is then exposed to a series of water rinse baths to remove any physically entangled or loosely bound polyelectrolyte. Following these rinse (e.g. bath) liquid solutions, the substrate is then exposed to a second polyion (e.g. bath) liquid solution, which has charge opposite that of the first polyion (e.g. bath) liquid solution. Once again adsorption occurs, since the surface charge of the substrate is opposite that of the second (e.g. bath) liquid solution. Continued exposure to the second polyion (e.g. bath) liquid solution then results in a reversal of the surface charge of the substrate. A subsequent rinsing can be performed to complete the cycle. This sequence of steps is said to build up one layer pair, also referred to herein as a "bi-layer" of deposition and can be repeated as desired to add further layer pairs to the substrate.

EXAMPLE 1

FIG. 1 shows an example of solid multilayer structure 10 according to an aspect of the present disclosure. The multilayer structure 10 includes protective layers 11 and 12 and two insulating layers of an insulating dielectric material (13 and 14) separated with one polarization layer (15). In this implementation, composite of polyaniline, PANI-DBSA/PAA, synthesized using in situ polymerization of aniline in an aqueous dispersion of poly-acrylic acid (PAA) in the presence of dodecylbenzene sulfonate (DBSA) is used as the material of the polarization layer, and polyethylene is used as the insulating dielectric material. Thickness of the insulating layer $d_{ins}$=2.5 nm. Dielectric permittivity of polyethylene is equal to 2.2 (i.e. $\varepsilon_{ins}$=2.2). The composite of polyaniline, PANI-DBSA/PAA has the dielectric permittivity $\varepsilon_{pol}$ equal to 100,000 and thickness of the conductive layer possessing molecular conductivity is $d_{pol}$=1.0 mm.

EXAMPLE 2

Figure 2:
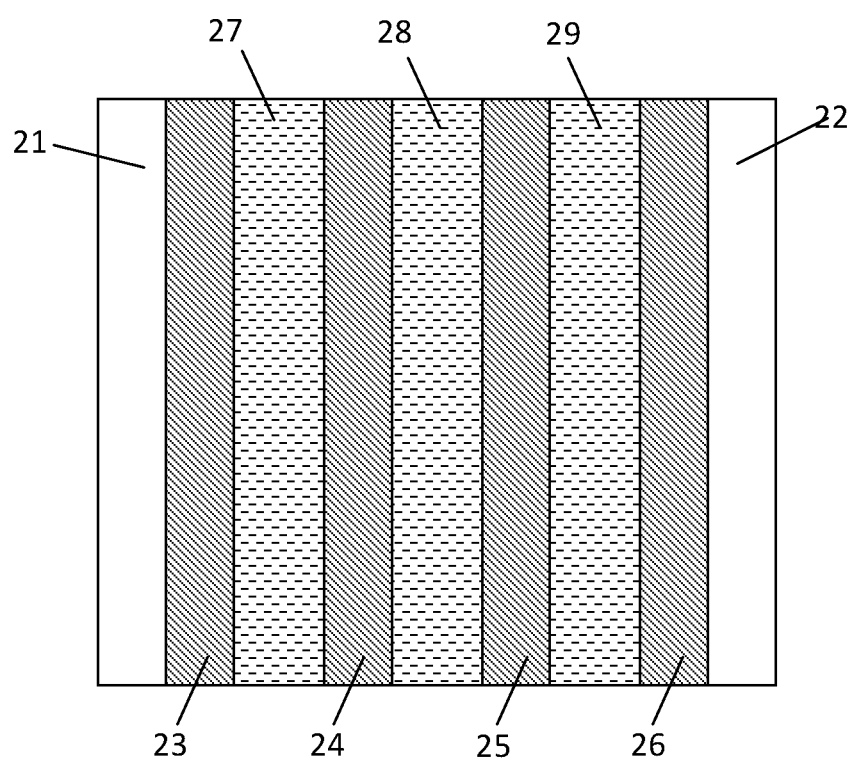
FIG. 2 schematically shows another embodiment of the disclosed solid multilayer structure.

FIG. 2 shows an embodiment of the disclosed solid multilayer structure that includes protective layers 21 and 22 and the alternating insulating and polarization layers, and wherein layers of an insulating dielectric material (23, 24, 25, 26) are separated by polarization layers (27, 28, 29). In this embodiment of the present invention, PANI-DBSA/PAA composite is used as a material of the polarization layers and polyethylene is used as an insulating dielectric material. Thickness of the insulating layer $d_{ins}$=2.5-1000 nm. The dielectric permittivity of polyethylene is equal to 2.2 (i.e. $\varepsilon_{ins}$=2.2) and breakdown voltage $V_{bd}$=40 kilovolt on thickness of 1 millimeter. In one embodiment, the material of the polarization layer is polyaniline (PANI)/ poly(acrylic acid) (PAA) composite which has the dielectric permittivity $\varepsilon_{pol}$ equal to 100,000. In this example, the thickness of the polarization layer $d_{pol}$=1.0-5.0 mm.

Figure 3:
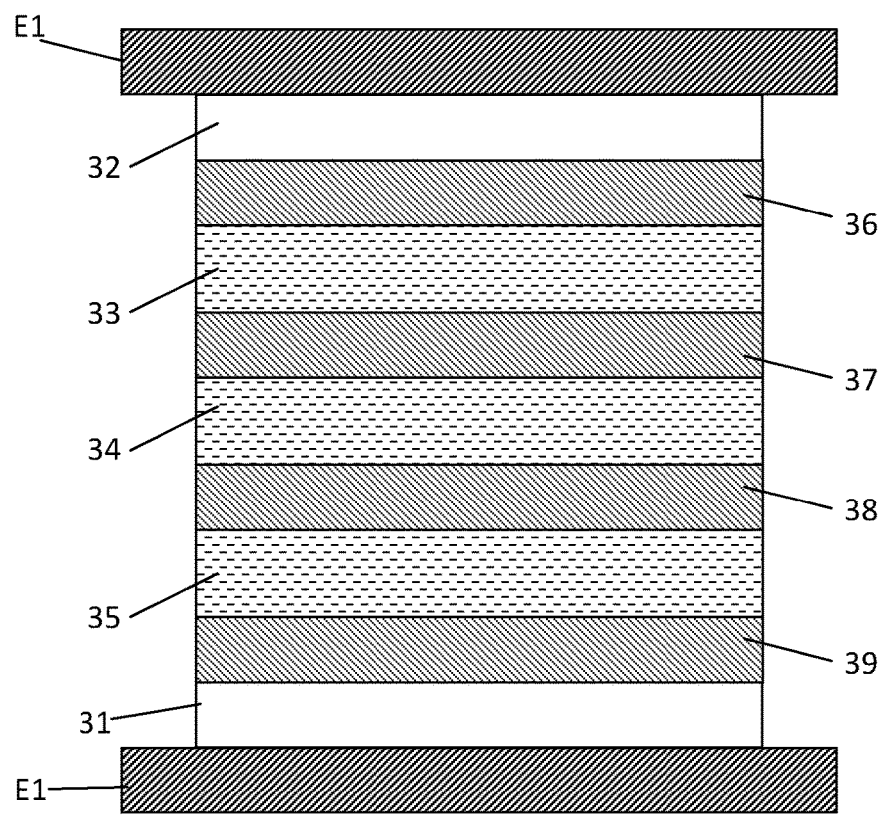
FIG. 3 schematically shows an example of a capacitor that uses the disclosed solid multilayer structure as a dielectric.

Aspects of the present disclosure include implementations in which by way of example and not by way of limitation FIG. 3 schematically shows an example of a capacitor 30 that uses the disclosed solid multilayer structure as a dielectric. In this example, layers of insulating dielectric material (33, 34, 35, 36) are separated by polarization layers (37, 38, 39), as in FIG. 2. This stack of alternating dielectric material and polarization layers is sandwiched between protective layers 31, 32. The stack of alternating dielectric material and polarization layers sandwiched between the protective layers is in turn sandwiched between first and second electrodes E1, E2 to form the capacitor 30. The large effective dielectric permittivity of the multi-layer structure allows for a very large capacitance and large energy storage capacity of the capacitor 30. Those skilled in the art will recognize that the number of alternating layers of insulating material and polarization layers may vary in alternative implementations in a manner consistent with the structures shown in FIG. 1 and FIG. 2. In general, the two outermost layers of the multilayer structure that are adjacent the electrodes E1, E2 are the protective layers, which are disposed between the outermost dielectric layers and the electrodes. The outermost polarization layers in the stack are separated from the nearest electrode by a dielectric layer and a protective layer.

Figure 4:
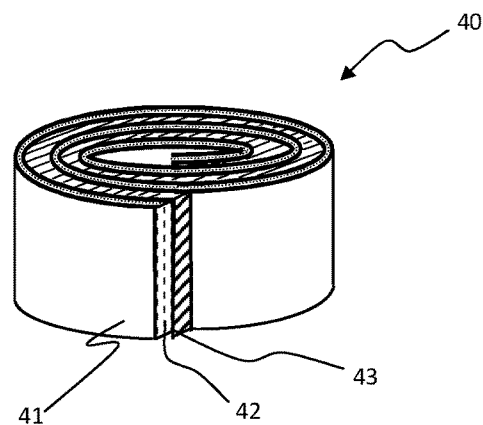
FIG. 4 shows an example of a wound capacitor.

A capacitor of the type shown in FIG. 3 may be made of long sheets of thin layers of materials that are sandwiched together and wound into a coil to pack a large-area capacitor into a compact volume. FIG. 4 schematically illustrates an example of such a coiled capacitor 40, which includes a first electrode 41, a second electrode 43, and a multi-layer structure 42 of the type described above disposed between said first and second electrodes. The electrodes 41, 43 may be made of a metal, such as copper, zinc, or aluminum or other conductive material and are generally planar in shape. In one implementation, the electrodes and the multilayer structure 42 may be in the form of long strips of material that are sandwiched together and wound into a coil along with an isolation material, e.g., a plastic film such as polypropylene or polyester to prevent electrical shorting between the electrodes 41, 43. In some instances, the isolation material may be a comprised of the insulating material described hereinabove.

Figure 5:
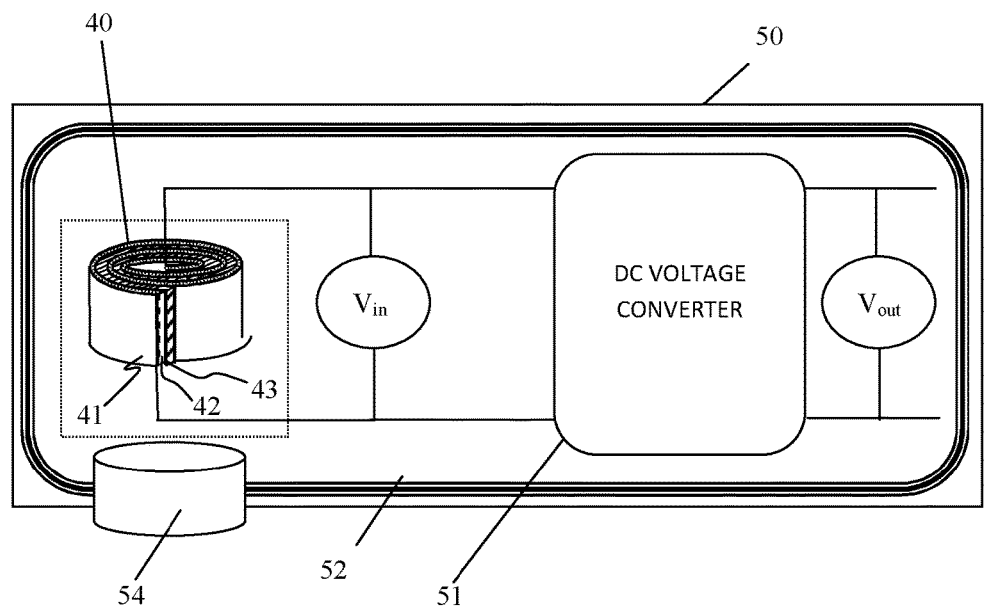
FIG. 5 schematically shows an energy storage cell according to aspects of the present disclosure.

One or more capacitors of the type shown in FIG. 3 or FIG. 4 may be used in an energy storage cell. By way of example, and not by way of limitation, FIG. 5 a possible implementation of an energy storage cell 50 that includes a capacitive energy storage device, e.g., one or more metacapacitors 40 of the type shown in FIG. 4 coupled to a DC voltage conversion device 51. Although a single meta-capacitor is depicted for simplicity, in other implementations the capacitive energy storage cell 50 combinations of two, or three or more meta-capacitors in a capacitor network involving various series and and/or parallel combinations may be coupled to the voltage conversion device 51.

In still another implementation, the capacitive energy storage cell 50 may further include a cooling system 52. In some implementations, the cooling can be passive, e.g., using radiative cooling fins on the capacitive energy storage device 50 and DC-voltage conversion device 51. Alternatively, a fluid such as air, water or ethylene glycol can be used as a coolant in an active cooling system. By way of example, and not by way of limitation, the cooling system 30 may include conduits in thermal contact with the capacitive energy storage device 40 and DC-voltage conversion device 51. The conduits are filled with a heat exchange medium, which may be a solid, liquid or gas. In some implementations, the cooling mechanism may include a heat exchanger 54 configured to extract heat from the heat exchange medium. In other implementations, the cooling mechanism 51 may include conduits in the form of cooling fins on the capacitive energy storage device 40 and DC-voltage conversion device 51 and the heat exchange medium is air that is blown over the cooling fins, e.g., by a fan. In another embodiment of the present invention, the heat exchanger 54 may include a phase-change heat pipe configured to carry out cooling. The cooling carried out by the phase-change heat pipe may involve a solid to liquid phase change (e.g., using melting of ice or other solid) or liquid to gas phase change (e.g., by evaporation of water or alcohol) of a phase change material. In yet another implementation, the conduits or heat exchanger 54 may include a reservoir containing a solid to liquid phase change material, such as paraffin wax.

Figure 6:
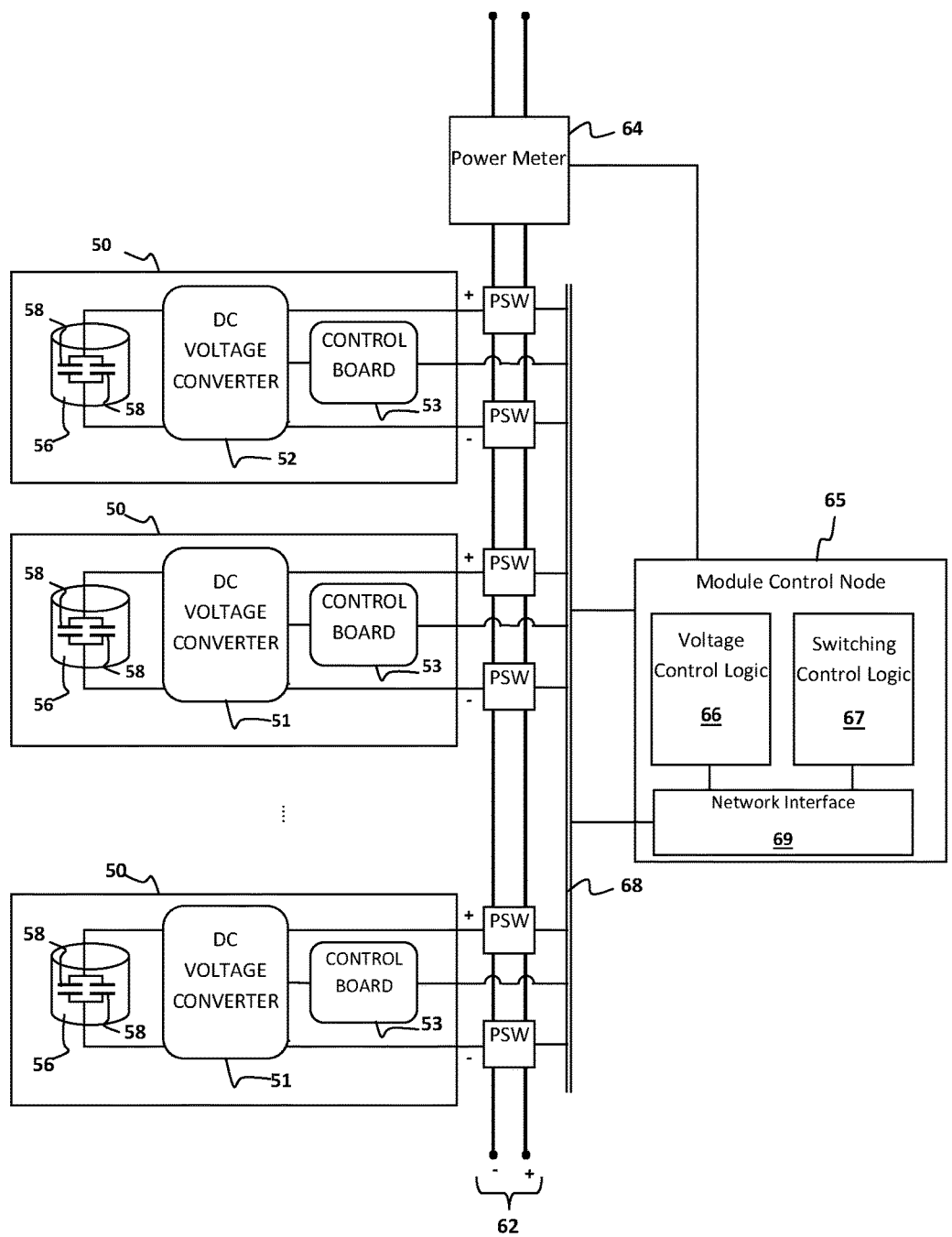
FIG. 6 shows an example of a capacitive energy storage module having two or more networked energy storage cells according to an alternative aspect of the present disclosure.

As an aspect of the present disclosure, a capacitive energy storage module 60, e.g., as illustrated in FIG. 6. In the illustrated example, the energy storage module 50 includes two or more energy storage cells 50 of the type described above. Each energy storage cell includes a capacitive energy storage device 56 having one or more capacitors 58 and a DC-voltage converter 51, which may be a buck converter, boost converter, or buck/boost converter. In addition, each module may include a control board 59 containing suitable logic circuitry, e.g., microprocessor, microcontroller, application specific integrated circuit (ASIC), field programmable gate array (FPGA), a complex programmable logic device (CPLD), capable of implementing closed loop control processes and (optionally) a communication interface, as well as an analog to digital converter coupled to sensors on the DC-voltage conversion device 51, e.g., voltage sensors V for the input voltage $V_{in}$ and the output voltage $V_{out}$, current sensors A for current $I_{sd}$ to/from the capacitive energy storage device 56 and/or current Ivc to/from the DC-voltage conversion device 51, temperature sensors on the capacitive energy storage device and/or DC-voltage conversion device. In some implementations, the control board 59 may be integrated into the DC-voltage conversion device 51. The conversion device 51 may contain a buck regulator, a boost regulator, buck and boost regulators with separate input/outputs, a bidirectional boost/buck regulator, or a split-pi converter and the control board 59 may be configured to maintain a constant output voltage $V_{out}$ from the DC-voltage conversion device during discharge, and/or charge the capacitor at a more-or-less constant current while maintaining a stable input voltage.

By way of example, and not by way of limitation, the control board 59 may be based on a controller for a bidirectional buck/boost converter. In such a configuration, the control board 59 stabilizes the output voltage of the DC-voltage conversion device according to an algorithm forming a suitable control loop. One example of a possible control loop is described in U.S. Patent Application Publication Number 20170237271, which is incorporated herein by reference.

The specifics of operation of the control board 59 are somewhat dependent on the type of buck/boost converter(s) used in the DC-voltage conversion device 51. For example, a buck/boost converter may be a single switch converter having a high-side switch with an input side coupled to the input voltage $V_{in}$ and an output side coupled to one side of an inductor, the other side of which is connected to the ground or common voltage. A capacitor is coupled across the output voltage $V_{out}$. A pulsed switching signal turns the switch on and off. The output voltage depends on the duty cycle of the switching signal. By way of example, the switches may be implanted as gated switch devices, e.g., MOSFET devices, stacked MOSFET devices, IGCT devices, high drain-source voltage SiC MOSFET devices, and the like depending on the voltage and/or current requirements of the DC-voltage converter for the energy storage cell. In the case of gated switching devices, the control board provides the signals to the gate terminals of the switching devices. The control board 59 can configure this type of buck/boost converter to buck or boost by adjusting the duty cycle of the switching signal.

The module 50 may further include an interconnection system that connects the anodes and cathodes of the individual energy storage cells to create a common anode and common cathode of the capacitive energy storage module. In some implementations, the interconnection system may include a parameter bus 62 and power switches PSW. Each energy storage cell 50 in the module 60 may be coupled to the parameter bus 62 via the power switches PSW. These switches allow two or more modules to be selectively coupled in parallel or in series via two or more rails that can serve as the common anode and common cathode. The power switches can also allow one or more energy storage cells to be disconnected from the module, e.g., to allow for redundancy and/or maintenance of cells without interrupting operation of the module. The power switches PSW may be based on solid state power switching technology or may be implemented by electromechanical switches (e.g., relays) or some combination of the two.

In some implementations, the energy storage module 60 further comprises a power meter 64 to monitor power input or output to the module. In some implementations, the energy storage module further comprises a networked control node 65 configured to control power output from and power input to the module. The networked control node 65 allows each module to talk with a system control computer over a high speed network. The networked control node 65 includes voltage control logic circuitry 66 configured to selectively control the operation of each of voltage controller 51 in each of the energy storage cells 50, e.g., via their respective control boards 59. The control node 65 may also include switch control logic circuitry 67 configured to control operation of the power switches PSW. The control boards 59 and power switches PSW may be connected to the control node 65 via a data bus 68. The voltage control and switching logic circuitry in the networked control node 65 may be implemented by one or more microprocessors, microcontrollers, application specific integrated circuits (ASICs), field programmable gate arrays (FPGAs), or complex programmable logic devices (CPLDs). The control node 65 may include a network interface 69 to facilitate transfer of signals between the voltage control logic circuitry 67 and the control boards 59 on the individual energy storage cells 50 and also to transfer signals between the switching logic circuitry 66 and the power switches PSW, e.g., via the data bus 68.

Figure 7:
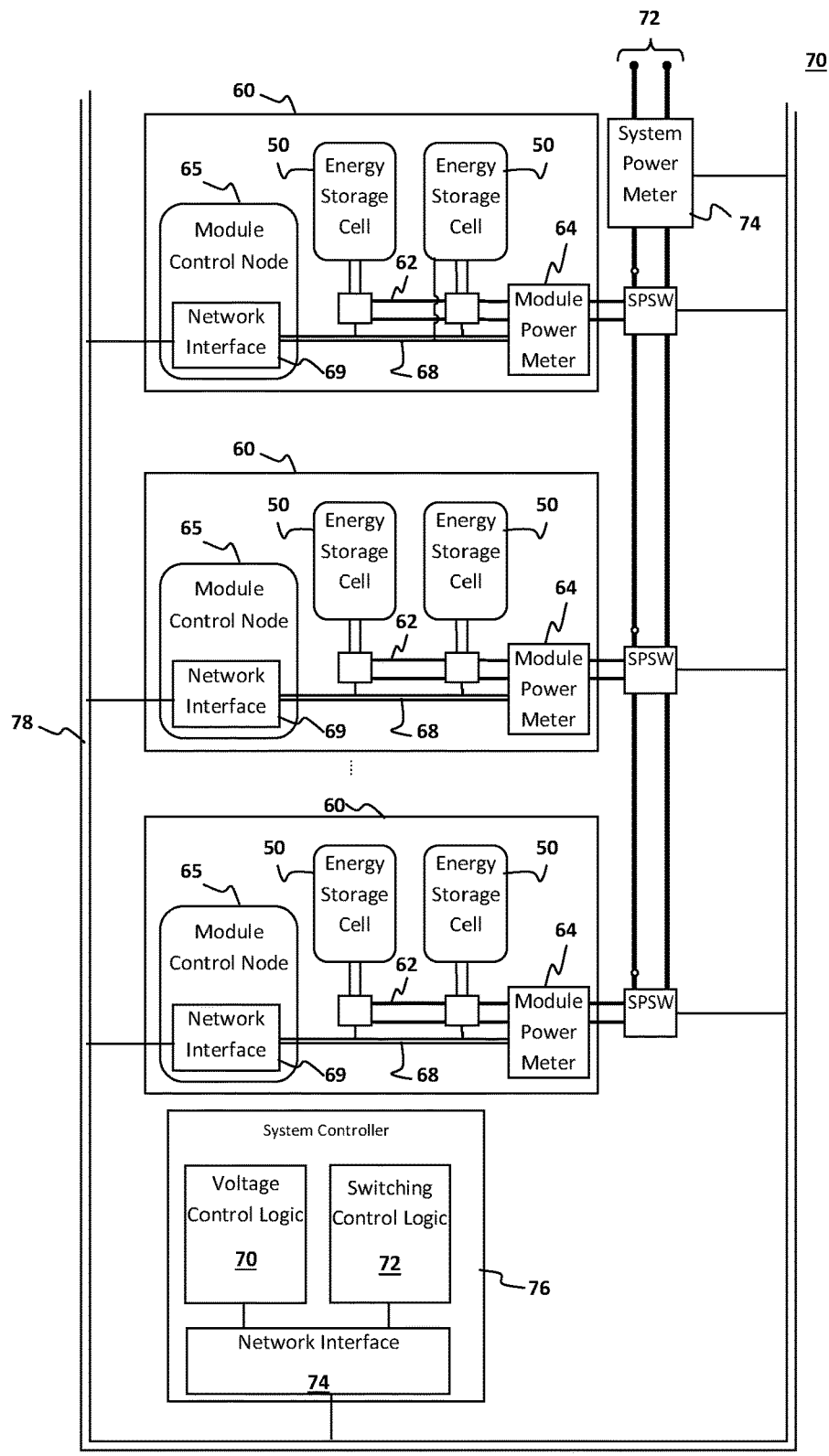
FIG. 7 shows an example of a capacitive energy storage system having two or more energy storage networked modules according to an alternative aspect of the present disclosure.

According to yet another aspect of the present disclosure a capacitive energy storage system may include two or more networked capacitive energy storage modules, e.g., of the type shown in FIG. 6. One embodiment of such a capacitive energy storage system 70 is shown in FIG. 7. The system 70 includes two or more energy storage modules 60 of the type shown in FIG. 6. Each capacitive energy storage module 60 includes two or more capacitive energy storage cells 50, e.g., of the type shown in FIG. 5 connected by an interconnection system 62 and controlled by a control node 65. Each capacitive energy storage module may also include a module power meter 64. Although it is not shown in FIG. 7, each control node 65 may include voltage control logic circuitry 66 to control voltage controllers within the individual capacitive energy storage cells 50 and switching logic circuitry 67 to control internal power switches with the module, as described above. In addition, each control node 65 includes an internal data bus 68 and a network interface 69, which may be configured and connected as described above. Power to and from capacitive energy storage modules 60 is coupled to a system power bus 72 via system power switches SPSW, which may be based on solid state power switching technology or may be implemented by electromechanical switches (e.g., relays) or some combination of the two. In some implementations, there may be an inverter (not shown) coupled between each capacitive energy storage module 60 and the system power bus 72 to convert DC power from the module to AC power or vice versa.

The system 70 includes a system controller 76 connected to a system data bus 78. The system controller may include switching control logic 72, voltage control logic 70, and system network interface 74. The voltage control logic 70 may be configured to control the operation of individual DC-voltage controllers within individual cells 50 of individual modules 60. The switching control logic 72 may be configured to control operation of the system power switches SPSW and also the power switches PSW within individual capacitive energy storage modules 60. Voltage control signals may be sent from the voltage control logic 72 to a specific DC-voltage control device 51 within a specific capacitive energy storage cell 50 of a specific capacitive energy storage module through the network interface 74, the system data bus 68, the module network interface 69 of the control node 46 for the specific module, the module data bus 68, and the control board 59 of the individual cells 50.

By way of example, and not by way of limitation, the system controller 76 may be a deterministic controller, an asynchronous controller, or a controller having distributed clock. In one particular embodiment of the capacitive energy storage system 70, the system controller 76 may include a distributed clock configured to synchronize several independent voltage conversion devices in one or more capacitive energy storage cells of one or more of the capacitive energy storage modules 60.

Aspects of the present disclosure allow for electrical energy storage on a much larger scale than possible with conventional electrical energy storage systems. A wide range of energy storage needs can be met by selectively combining one or more capacitors with a DC-voltage conversion devices into a cell, combining two or more cells into a module, or combining two or more modules into systems.

Although the present invention has been described in detail with reference to a particular embodiment, persons possessing ordinary skill in the art to which this invention pertains will appreciate that various modifications and enhancements may be made without departing from the spirit and scope of the claims that follow. While the above includes a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An"

refers to a quantity of one or more of the item following the article, except where expressly stated otherwise. As used herein, in a listing of elements in the alternative, the word "or" is used in the logical inclusive sense, e.g., "X or Y" covers X alone, Y alone, or both X and Y together, except where expressly stated otherwise. Two or more elements listed as alternatives may be combined together. The appended claims are not to be interpreted as including means-plus-function limitations, unless such a limitation is explicitly recited in a given claim using the phrase "means for."

What is claimed is:

1. A solid multilayer structure comprising a plurality of m polarization layers, and a plurality of m+1 insulating layers disposed in a repeating sequence with the plurality of the polarization layers,
   wherein at least one polarization layer comprised of materials selected from non-linear polarizable composite compounds and side chain polymers with non-linear polarizable pendants, and m is a number greater than or equal to 1,
   wherein the insulating layer has a breakdown voltage greater than or equal to 0.01 volts (V) per nanometer (nm), and the polarization layer has a dielectric permittivity greater than or equal to 100.

2. The solid multilayer structure of claim 1, wherein resistivity is between about $10^{15}$ Ohm cm and $10^{22}$ Ohm cm.

3. The solid multilayer structure of claim 1, wherein the insulating layers may be fabricated from a material selected from crystalline material, poly-crystal material, semi-crystalline, aligned supramolecular structures, and amorphous material.

4. The solid multilayer structure of claim 1, wherein the insulating layers is characterized by a band gap of greater than 4 eV and by breakdown field strength of greater than about 0.001 volts (V)/nanometer (nm), 0.01 V/nm, 0.05 V/nm, 0.1 V/nm, 0.2 V/nm, 0.3 V/nm, 0.4 V/nm, 0.5 V/nm, or 1 V/nm.

5. The solid multilayer structure of claim 1, wherein at least one of the insulating layers A comprises a modified organic compounds of the general structural formula I:

$$\{Cor\}(M)_k, \qquad (I)$$

where Cor is a polycyclic organic compound, each M is independently a modifying functional group; and k is an integer of the modifying functional groups that is greater than or equal to zero, and wherein the polycyclic organic compound is selected from the group consisting of rylene fragments, chromophores, oligophenyl, imidazole, pyrazole, acenaphthene, triaizine, indanthrone and structures 1-44 and their derivative structures:

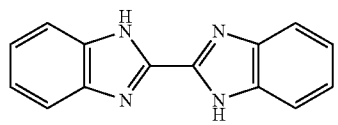

1

2

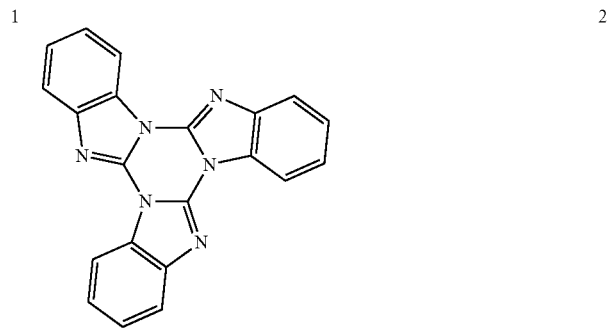

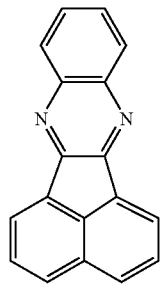

3

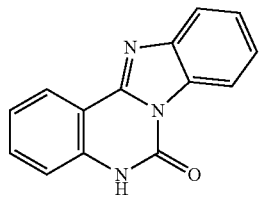

4

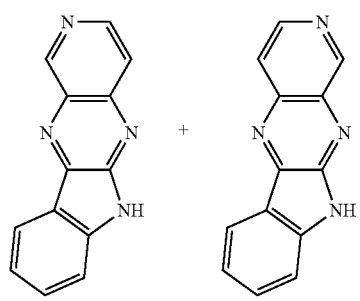

5

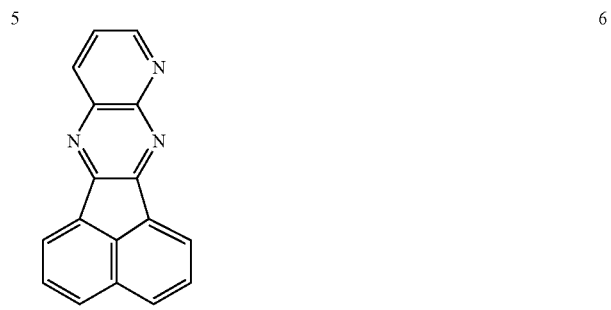

6

-continued
7
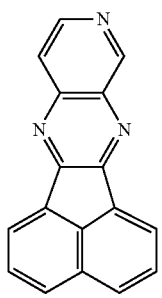
8
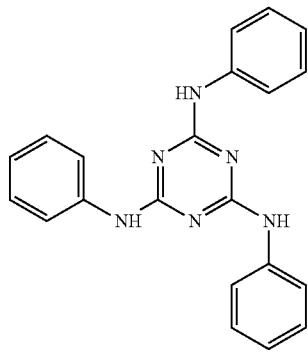
9
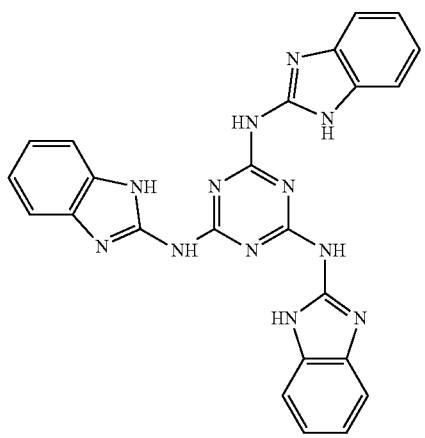
10
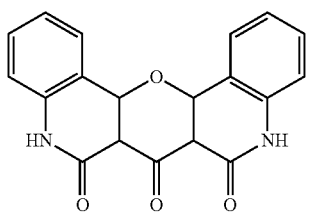
11
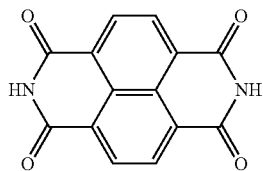
12
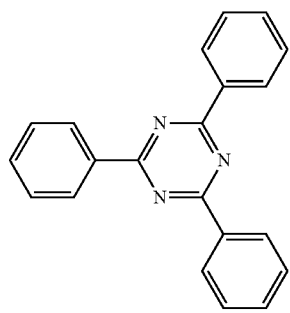
13
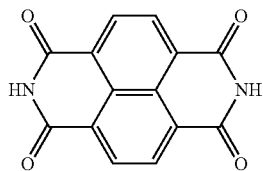
14
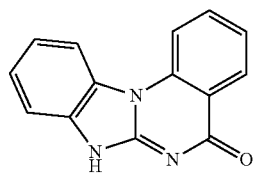
15
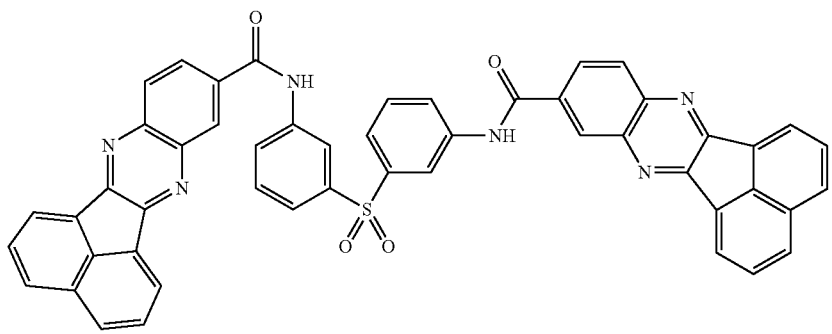

-continued
16
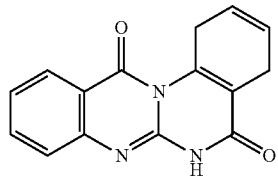
17
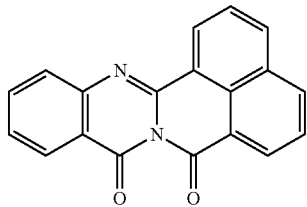
18
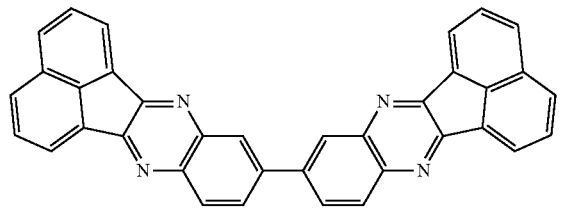
19
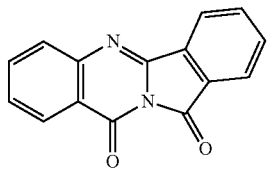
20
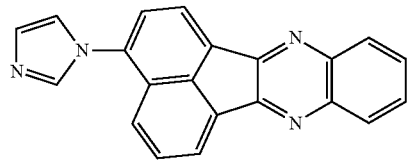
21
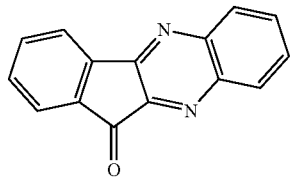
22
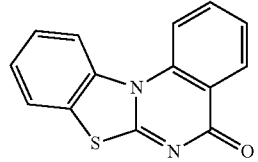
23
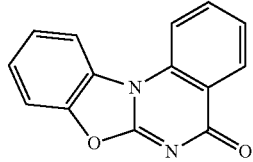
24
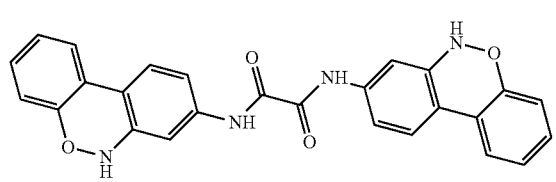
25
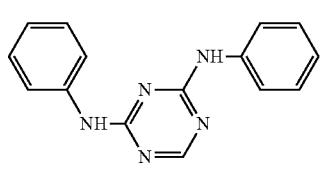
26
27
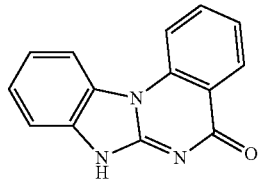
28
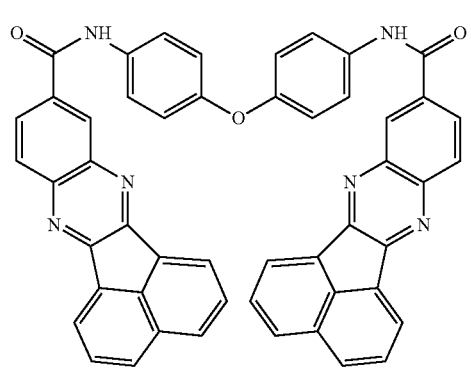

-continued
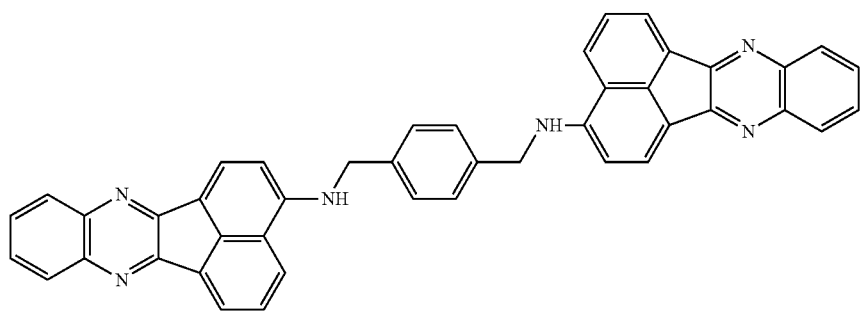
29
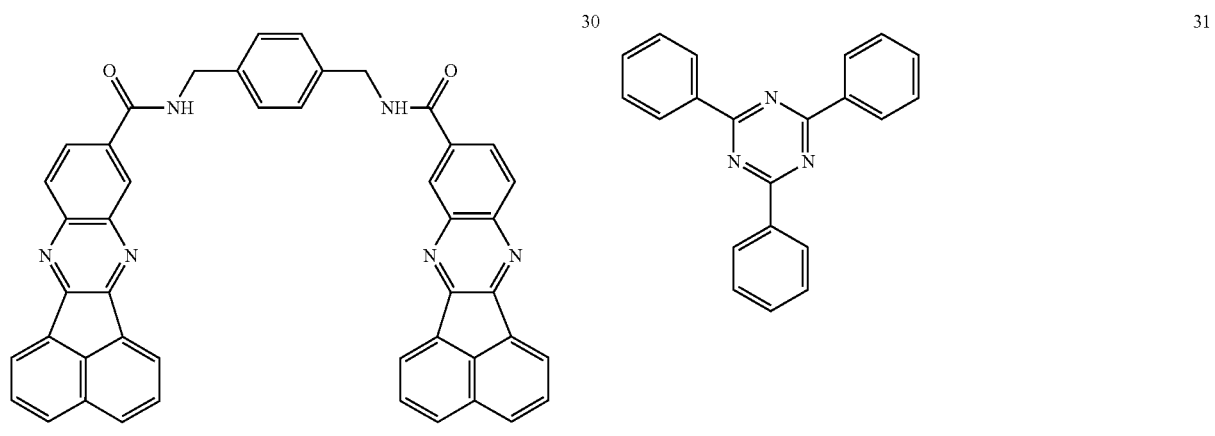
30
31
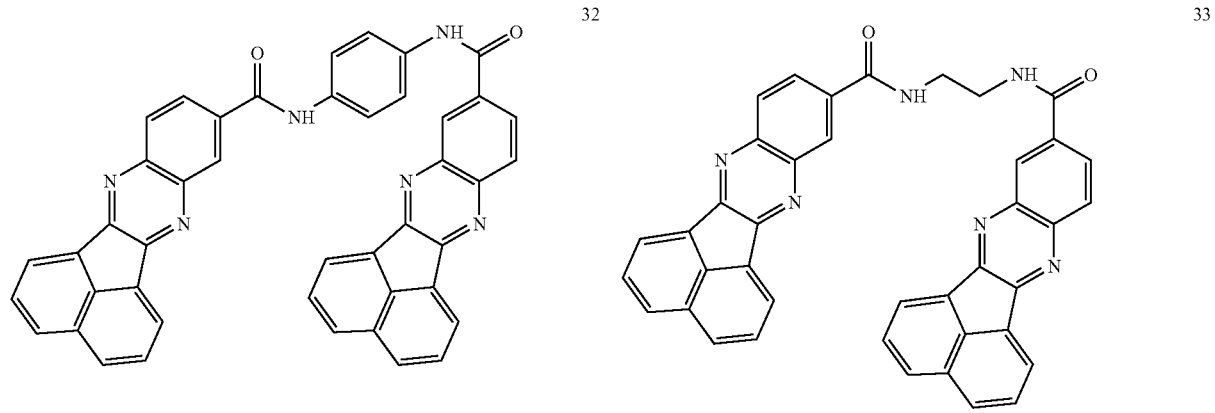
32
33
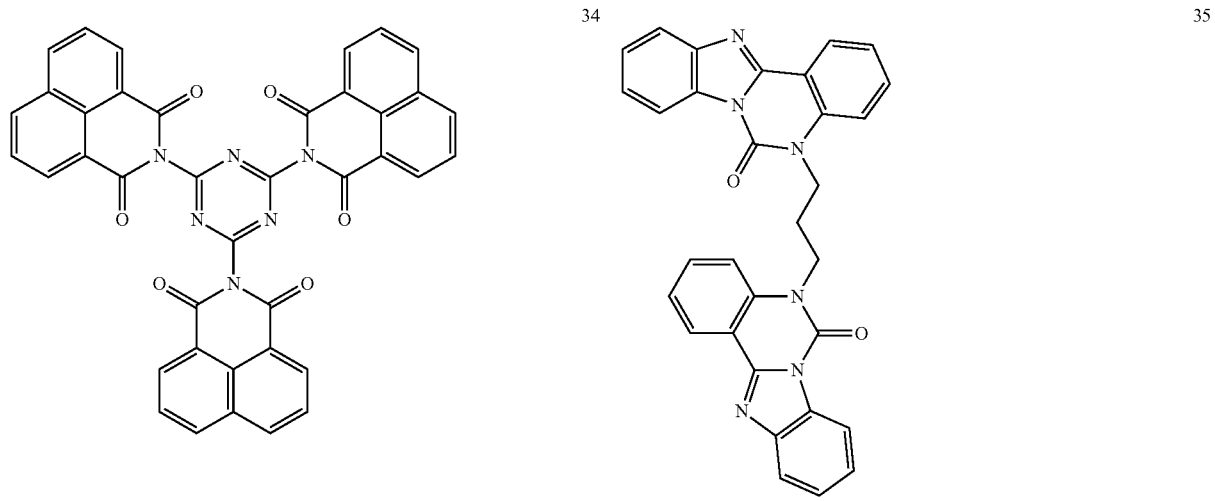
34
35

-continued

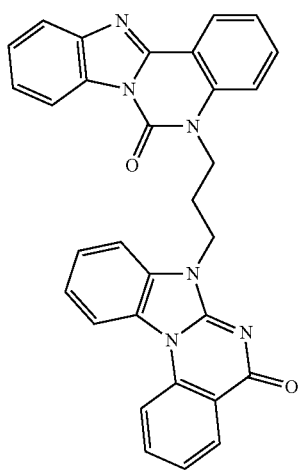

36

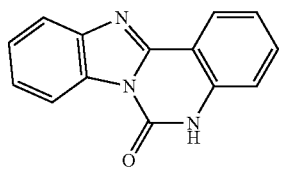

37

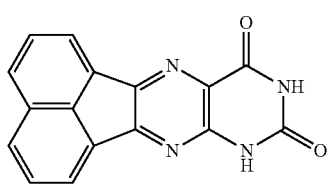

38

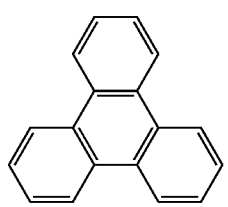

39

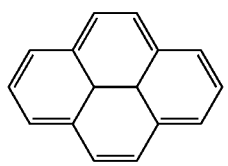

40

41

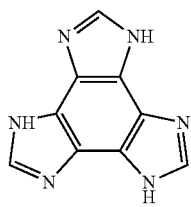

42

43

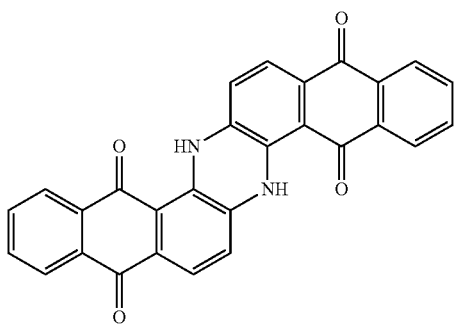

44 wherein the modifying functional groups M are selected from the group consisting of alkyl, aryl, substituted alkyl, and substituted aryl, electrophilic groups, nucleophilic groups, and any combination thereof, wherein at least one of the insulating layers comprise a polymeric materials selected from the list comprising fluorinated alkyls, polyethylene, poly-paraphenyiene terephthalamide (kevlar), poly(vinylidene fluoride-hexafluoropropylene), polypropylene, fluorinated polypropylene, and polydimethylsiloxane, wherein at least one of the insulating layers comprise a polymeric material formed on the basis of water-soluble polymers having a structure selected from the structures 45 to 50:

51

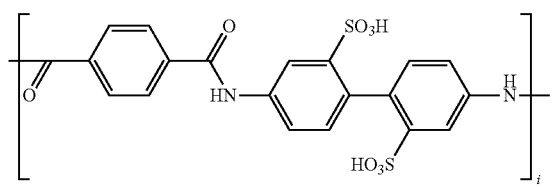
poly(2,2'-disulfo-4,4'-benzidine terephthalamide)

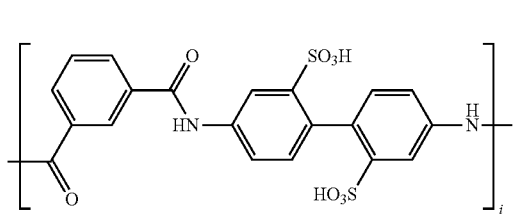
poly(2,2'-disulfo-4,4'-benzidine isophthalamide)

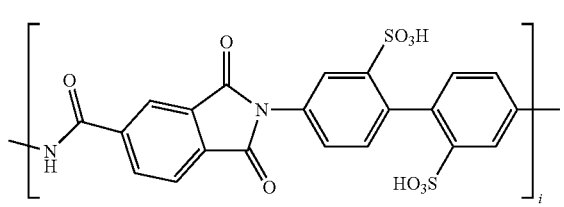
poly(2,2'-disulfo-4,4'-benzidine 1,3-dioxo-isoindoline-5-carboxamide)

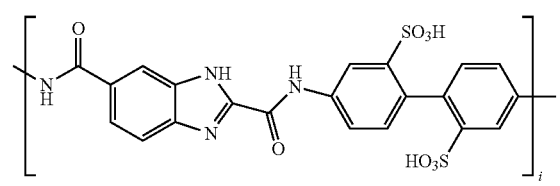
poly(2,2'-disulfo-4,4'-benzidine 1H-benzimidazole-2,5-dicarboxamide)

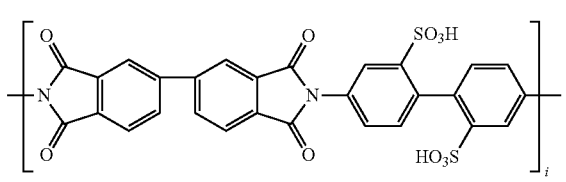
poly(2,2'-disulfo-4,4'-benzidine 3,3',4,4'-biphenyl tetracarboxylic acid diimide)

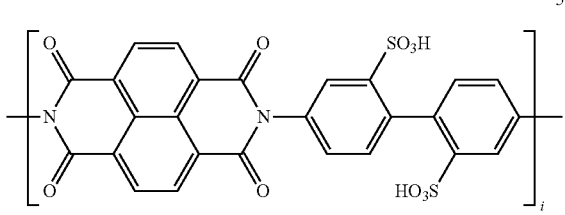
poly(2,2'-disulpho-4,4'benzidine 1,4,5,8-naphtalen tetracarboxylic acid diimide).

52

6. The solid multilayer structure of claim 5, wherein at least one of the insulating layers comprises a material selected from oxides (may be selected from $SiO_2$, $HfO_2$, $Al_2O_3$), nitrides (may be $Si_3N_4$), oxynitrides and fluorides.

7. The solid multilayer structure of claim 1, wherein at least one of the insulating layers comprises a material formed on the basis of polymers soluble in organic solvents and having a structure selected from the structures 51 to 56:

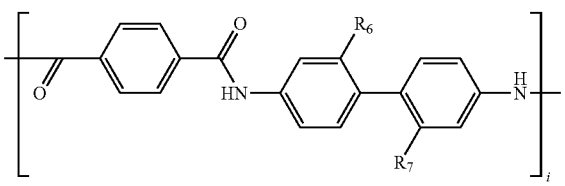

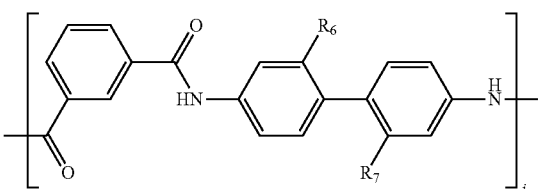

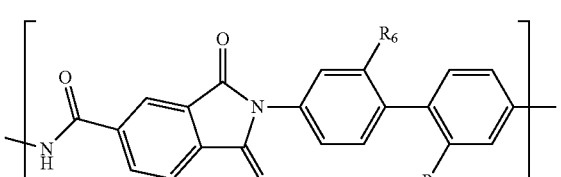

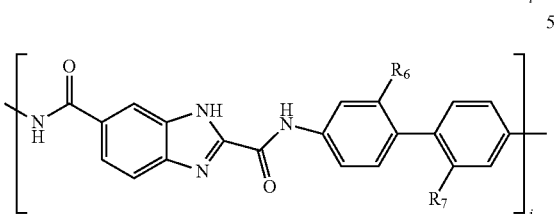

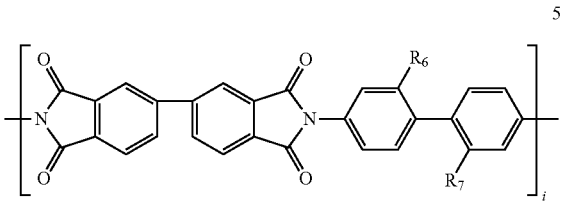

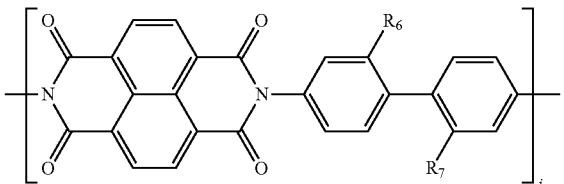

wherein each modifying functional groups $R_6$ and $R_7$ is independently selected from alkyl, aryl, substituted alkyl, substituted aryl, nucleophilic, and electrophilic groups and any combination thereof.

8. The solid multilayer structure of claim 1, wherein at least one of the polarization layers may be fabricated from a material selected from crystalline material, poly-crystal material, and amorphous material and its material possesses dielectric permittivity $\varepsilon_{pol}$ which may be in the broad range at least about 100, 200, 300, 400, 500, 1000, 2000, 3000, 4000, 5000, 6000, 7000, 8000, 9000, 10,000, or 100,000.

9. The solid multilayer structure of claim 1, wherein the thickness of the insulating layer ($d_{ins}$) and thickness of the polarization layer ($d_{pol}$) and breakdown field strength of the insulating layers $E_{ins}$ and breakdown field strength of the polarization layers $E_{pol}$ satisfy the following relations: $d_{ins} < d_{pol}$, and $E_{ins} > E_{pol}$.

10. The solid multilayer structure of claim 1, wherein the parameter m is greater than or equal to 1, a dielectric material of the insulating layers is polyethylene, a material of the polarization layer is a micro-dispersion PANI-DBSA/PAA, the ratio of PANI to PAA in the composite is greater than or equal to about 20 wt %, a thickness of the insulating layer $d_{pol}$ is from 2.5 nm to 1000 nm, and a thickness of the polarization layer ($d_{pol}$) is from 10 micrometer (μm) to 1.0 mm.

11. The solid multilayer structure of claim 1, wherein the parameter m is greater than or equal to 1, a dielectric material of the insulating layers is polyethylene, a thickness of the insulating layer ($d_{ins}$) is from 2.5 nm to 1000 nm, and a thickness of the polarization layer ($d_{cond}$) is from 10 micrometer (μm) to 50 μm.

12. The solid multilayer structure of claim 1, wherein said polarization layers comprise a surfactant selected from: dodecylbenzenesulfonate (DBSA), polyoxyethylene glycol alkyl ethers, polyoxypropylene glycol alkyl ethers, polyoxyethylene glycol octylphenol ethers, polyoxyethylene glycol sorbitan alkyl esters, sorbitan alkyl esters, and dobecyldimethylamine oxide.

13. The solid multilayer structure of claim 1, further comprising additional protective layers located upon and/or under the solid multilayer structure, wherein the additional protective layers protect the plurality of insulating and polarization layers from damage, aid in co-extrusion processing and/or to enhance mechanical properties at post-processing.

14. The solid multilayer structure of claim 13, wherein the additional protective layers comprise polymers such as polyesters including carboxylate and glycol monomer molecules, wherein the carboxylate monomer molecules comprise 2,6-naphthalene dicarboxylic acid and isomers thereof, terephthalic acid; isophthalic acid; phthalic acid; azelaic acid; adipic acid; sebacic acid; norbornene dicarboxylic acid; bi-cyclo-octane dicarboxylic acid; 1,4-cyclohexane dicarboxylic acid and isomers thereof, t-butyl isophthalic acid, trimellitic acid, sodium sulfonated isophthalic acid; 4,4'-biphenyl dicarboxylic acid and isomers thereof, and lower alkyl esters of these acids, such as methyl or ethyl esters where the term "lower alkyl" refers to C1-C10 straight-chained or branched alkyl groups, and wherein the glycol monomer molecules comprise ethylene glycol; propylene glycol; 1,4-butanediol and isomers thereof, 1,6-hexanediol; neopentyl glycol; polyethylene glycol; diethylene glycol; tricyclodecanediol; 1,4-cyclohexanedimethanol and isomers thereof; norbornanediol; bicyclo-octanediol; trimethylol propane; pentaerythritol; 1,4-benzenedimethanol and isomers thereof, bisphenol A; 1,8-dihydroxy biphenyl and isomers thereof, and 1,3-bis (2-hydroxyethoxy) benzene.

15. The solid multilayer structure of claim 13, further comprising binding (tie) layers which may be present between the additional protective layers and the insulating layers and polarization and/or between the insulating layers and polarization.

16. The solid multilayer structure of claim 15, wherein the binding (tie) layers comprise polydimethyl siloxane oxamide based segmented copolymer (SPDX), and copolymers of polyethylene terephthalates (CoPETs) including modifications with functional groups such as sulfonic acids, poly (methyl methacrylate)/ poly(vinylidene fluoride (PMMA/PVDF) blends, modified olefins with functional co-monomers such as maleic anhydride, acrylic acid, methacrylic acid or vinyl acetate, UV or thermally curable acrylates, silicones, epoxies, siloxanes, and urethane acrylates, conventional plasticizers, tackifiers, or combinations thereof.

17. The solid multilayer structure of claim 1, further comprising hard layers which are located inside and outside the multilayer structure and provide its impact-resistance and prevent interlayer abrasion of the multilayered structure.

18. The solid multilayer structure of claim 17, wherein the hard layers comprise PMMA/PVDF blends, thermoplastic polyurethanes, curable polyurethanes, CoPET, cyclic olefin copolymers (COC's), fluoropolymers and their copolymers such as poly(vinylidene fluoride) (PVDF), ETFE, FEP, and THV, thermoplastic and curable acrylates, cross-linked acrylates, cross-linked urethane acrylates, cross-linked urethanes, curable or cross-linked polyepoxides, and SPDX.

19. The solid multilayer structure of claim 1, wherein at least one insulating layer and one polarization layer are covalently bonded, and wherein the insulating layers are comprised of carbon chain moieties longer than four carbons, and wherein the polarization layers are comprised of electrically polarizable moieties.

20. The solid multilayer structure of claim 1, wherein at least one insulating layer is comprised of two sets of carbon chain moieties longer than 4 carbons which are intercalated, and wherein one set of carbon chain moieties is covalently bonded to a first polarization layer and another set of carbon chain moieties is covalently bonded to a second polarization layer, and wherein the polarization layers are covalently bonded to sequential insulating layers, and wherein the polarization layers are comprised of electrically polarizable moieties.

21. The solid multilayer structure of claim 1, wherein the insulating layer includes at least one composite polymeric materials of the following general formula:

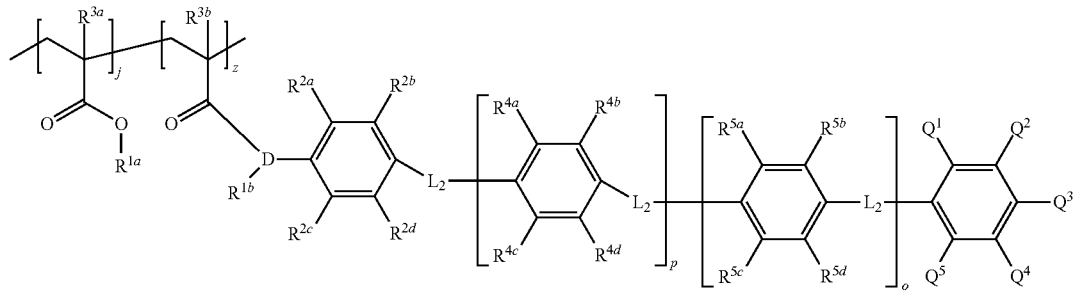

wherein D is

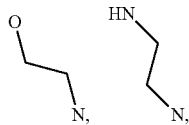

N, or a hydrocarbon chain, wherein $R^{1a}$, $R^{1b}$, $R^{2a}$, $R^{2b}$, $R^{2c}$, $R^{2d}$, $R^{3a}$, $R^{3b}$, $R^{4a}$, $R^{4b}$, $R^{4c}$, $R^{4d}$, $R^{5a}$, $R^{5b}$, $R^{5c}$, $R^{5d}$ are independently selected from —H, —OH, -Ak, -Ak-X, -OAk, or -OAk-X; $L_2$ is a heteroatom bridge in conjugation with the ring system containing $R^{2a}$, $R^{2b}$, $R^{2c}$, $R^{2d}$, $Q^1$, $Q^2$, $Q^3$, $Q^4$, $Q^5$; wherein $R^{2a}$, $R^{2b}$, $R^{2c}$, $R^{2d}$, $Q^1$, $Q^2$, $Q^3$, $Q^4$, $Q^5$ are each independently selected from —H and any electron withdrawing or electron donating group; wherein Ak is alkyl, X is any halogen, j is 0-150, z is 1-300, 1 is 1-51, o is 0-10, p is 0-1 when o is less than or equal to one and 1 when o is greater than 1, wherein $R^{1a}$ or $R^{1b}$ is an insulating resistive tail or both $R^{1a}$ and $R^{2a}$ are insulating resistive tails.

22. A capacitor comprising:
a first electrode;
a second electrode, and a dielectric layer of molecular material disposed between said first and second electrodes, wherein the dielectric layer includes the solid multilayer structure of claim 1.

* * * * *